(12) United States Patent
MacLean et al.

(10) Patent No.: US 9,317,186 B2
(45) Date of Patent: Apr. 19, 2016

(54) DOCUMENT PUBLISHING MODEL

(71) Applicant: Apple Inc., Cupertino, CA (US)

(72) Inventors: Alexander C. MacLean, San Jose, CA (US); Jay C. Capela, Santa Cruz, CA (US); Charles J. Migos, Millbrae, CA (US); Markus Hagele, San Francisco, CA (US); Christopher E. Rudolph, Vancouver (CA)

(73) Assignee: APPLE INC., Cupertino, CA (US)

( * ) Notice: Subject to any disclaimer, the term of this patent is extended or adjusted under 35 U.S.C. 154(b) by 174 days.

(21) Appl. No.: 13/657,823

(22) Filed: Oct. 22, 2012

(65) Prior Publication Data

US 2014/0115508 A1   Apr. 24, 2014

(51) Int. Cl.
| | |
|---|---|
| G06F 3/048 | (2013.01) |
| G06F 3/0483 | (2013.01) |
| G06F 17/21 | (2006.01) |
| G06F 17/27 | (2006.01) |
| G06F 17/30 | (2006.01) |

(52) U.S. Cl.
CPC ............ *G06F 3/0483* (2013.01); *G06F 17/212* (2013.01); *G06F 17/2725* (2013.01); *G06F 17/30011* (2013.01)

(58) Field of Classification Search
None
See application file for complete search history.

(56) References Cited

U.S. PATENT DOCUMENTS

| | | | | |
|---|---|---|---|---|
| 7,343,324 B2 * | 3/2008 | Lao et al. | ...................... | 705/27.1 |
| 7,437,659 B2 * | 10/2008 | Taniwaki et al. | ............. | 715/200 |
| 8,290,206 B1 * | 10/2012 | Meyers | ......................... | 382/100 |
| 8,310,696 B2 * | 11/2012 | Gustafson et al. | ........... | 358/1.15 |
| 8,725,565 B1 * | 5/2014 | Ryan | ............................. | 705/14.4 |
| 8,755,058 B1 | 6/2014 | Jackson | | |
| 2003/0018663 A1 | 1/2003 | Cornette et al. | | |
| 2004/0034834 A1 * | 2/2004 | Pirie et al. | ...................... | 715/527 |
| 2005/0246660 A1 * | 11/2005 | Fehrm | .......................... | 715/810 |
| 2006/0080616 A1 * | 4/2006 | Vogel | .................... | G06F 9/4443 715/769 |
| 2007/0291297 A1 | 12/2007 | Harmon et al. | | |
| 2008/0005666 A1 | 1/2008 | Sefton et al. | | |
| 2008/0243805 A1 | 10/2008 | Gutta et al. | | |
| 2009/0031216 A1 * | 1/2009 | Dressel | .................. | G06Q 30/02 715/255 |
| 2009/0254802 A1 | 10/2009 | Campagna et al. | | |
| 2010/0031159 A1 * | 2/2010 | Hummel | ....................... | 715/741 |
| 2011/0191662 A1 | 8/2011 | Poteet, II et al. | | |
| 2012/0096087 A1 | 4/2012 | Curcelli | | |

(Continued)

FOREIGN PATENT DOCUMENTS

WO    WO 2014/065988    5/2014

OTHER PUBLICATIONS

How To: Self Publish Your Book with Amazon's CreateSpace, Jul. 19, 2011, by Yuli Ziv.*

(Continued)

*Primary Examiner* — Matt Kim
*Assistant Examiner* — Mahelet Shiberou
(74) *Attorney, Agent, or Firm* — Adeli LLP

(57) ABSTRACT

Some embodiments described herein provide a content publishing tool for publishing documents to a content distribution system. The content publishing tool in some embodiments guides the application's user through different operations in preparing a document for publication. In some embodiments, these operations include one or more of the following: (1) analyzing the document for errors, (2) specifying a version number for the document, (3) creating a sample document, and (4) exporting the document for publication.

17 Claims, 28 Drawing Sheets

(56) References Cited

U.S. PATENT DOCUMENTS

| | | | |
|---|---|---|---|
| 2013/0073998 | A1 | 3/2013 | Migos et al. |
| 2013/0074148 | A1 | 3/2013 | Van Megchelen |
| 2013/0191708 | A1 | 7/2013 | Song |
| 2013/0191728 | A1* | 7/2013 | McKinney et al. .......... 715/243 |
| 2014/0115435 | A1 | 4/2014 | Elseth et al. |
| 2014/0115449 | A1 | 4/2014 | Migos et al. |

OTHER PUBLICATIONS eBook Starter—A Complete Ebooks Software—Ebook Creator Compiler for All Your Ebook Publishing Needs—Step by Step Ebook Wizard https://web.archive.org/web/20100923023156/http://ebookstarter.com/.*

Author Unknown, "Amazon Kindle Publishing Guidelines," Dec. 13, 2011, 79 pages, Version 1.8, http://www.kulturkik.euskadi.net/amazon-kindle-publishing-guidelines-como-hacer-que-los-libros-esten-disponibles-para-la-plataforma-kindle/.

International Search Report and Written Opinion for PCT/US2013/062489, Mar. 14, 2014 (mailing date), Apple Inc.

Author Unknown, "iBooks Author: How to update your published book in the iBookstore," Mar. 23, 2012, 2 pages, available at http://web.archive.org/web/20120422084906/http://support.apple.com/kb/HT5213.

Author Unknown, "Content Update notice for a Kindle book (The Holy Bible ESV)—MobileRead Forums," Jun. 30, 2011, 4 pages, available at http://www.mobileread.com/forums/showthread.php?t=141101.

Author Unknown, "Smashwords—About Smashwords—How to Publish iPad Ebooks," Oct. 10, 2012, 3 pages, retrieved from the internet at http://web.archive.org/web/20121010113623/https//:www.smashwords.com/about/how_to_publish_ipad_ebooks.

Author Unknown, "iBooks Author: How to update your published book in the iBookstore," Jan. 14, 2013, 1 page, retrieved from the internet at http://web.archive.org/web/20130308020451/http://support.apple.com/kb/HT5213.

Author Unknown, "Ebooks—O'Reilly Media," Oct. 10, 2012, 3 pages, retrieved from the internet at http://web.archive.org/web/20121010160505/http://shop.oreily.com/category/ebooks.do.

Portions of prosecution history of U.S. Appl. No. 13/657,829, May 8, 2015, Elseth, Ian J., et al.

Portions of prosecution history of U.S. Appl. No. 13/657,838, May 26, 2015, Migos, Charles J., et al.

* cited by examiner

DOCUMENT PUBLISHING MODEL

BACKGROUND

Electronic books (ebooks) have become very popular in recent years. One reason for their popularity is that, unlike physical books, they are very portable. A person can import hundreds of ebooks into a portable computing device (e.g., smart phone, tablet), carry the device around, and view any one of the ebooks using the device. There are also many online bookstores from different content distributors, which make it easy for the person to obtain them. For instance, the person can browse a content publisher's online bookstore for a book, input payment information, and download the book.

Different from downloading, creating and publishing a book can be a daunting task. As an example, an author has to spend many hours just to write the book. If the author is a self-publisher, then the author has to research how to publish the book with a content publisher. After researching, the author has to format the book following the content publisher's guidelines using one or more applications, create supplemental items (e.g., cover page, sample book), open a publishing account, and then hope he or she did not miss a step. While not as difficult as writing a good book, publishing a book can take a lot of time and effort.

BRIEF SUMMARY

Some embodiments described herein provide a novel content authoring application for publishing electronic documents (e.g., ebooks, electronic magazines, electronic newspapers) to a content distribution system. The content authoring application of some embodiments includes a publishing tool. The publishing tool implements a publishing model that guides a user through different operations in preparing a document for publication. In some embodiments, these operations include performing a pre-publish check of the document and exporting the document for publication. The document may be exported in a particular format specified by the content distribution system. In some embodiments, the content authoring application exports the document with other supplemental items that the content distribution system uses to publish the document (e.g., cover art, document metadata, etc.).

The pre-publish check of some embodiments entails analyzing a document to identify errors that prevents the document from being published with the content distribution system. For instance, the document may be associated with a media item that cannot be optimized, an object that has an invalid format, etc. In some embodiments, the application analyzes the document for other errors that prevent the document from being published properly, such as missing fonts, missing images, etc. By performing the pre-publish check, a self-publishing author does not have to research different guidelines in publishing his or her work to the content distribution system. In other words, the author can concentrate more on writing the document rather than expending valuable time researching how to publish the document and preparing the document for publication.

In conjunction with the publishing tool or instead of it, the content authoring application in some embodiments provides a document-sampling tool. This tool allows a user to identify a section of a document (e.g., a chapter of a book) and generate a sample document that includes a selection of pages from that section. Different heuristics can be used to generate the sample document using the pages from the section. For example, the sample document may be generated using a predefined percentage (e.g., 20%) of the pages of the section up to a maximum of a predefined number of pages (e.g., 20 pages). The heuristics of the sample generation may also specify that the sample document include a minimum of some number of pages (e.g., three pages).

The content authoring application of some embodiments provides a versioning tool for specifying whether a document is a new document or an updated version of a document that has been published with the content distribution system. The tool includes a field to input version information (e.g., version number, issue number, edition information). The versioning tool of some embodiments presents a list of published documents. The user can then choose, from the list, a published document that is being updated. The content authoring application may access a publishing account associated with the user to display the list of published documents.

In some embodiments, the versioning tool and the sampling tool are provided as parts of the publication tool. That is, the publication tool of some embodiments not only guides a user through the pre-publish check and export operations, but also guides the user through specifying version information for a document and creating a sample document.

In addition to the content authoring application, some embodiments described herein provides a novel content viewing application. The content viewing application can be used to purchase and download a version of a document. When the document is updated to a newer version, the content viewing application in some embodiments presents one or more notifications regarding the update. For instance, the application might mark the application's icon and/or a menu item with a marking that provides a visual indication of the update. The document can then be updated to the new version using the application. Accordingly, the documents are no longer static items, but change (e.g., evolve) over time. In some embodiment, the new version of a document replaces the old version of the same document. However, the content viewing application might retain the old version or provide an option to retain it, so that the application's user can choose which version to view.

Several more detailed embodiments of the invention are provided below. Many of these examples refer to controls (e.g., selectable items) that are part of an image editing application. This application in some embodiments is a standalone application that executes on top of the operating system of a device, while in other embodiments it is part of the operating system. Also, in many of the examples below (such as those illustrated in FIGS. 1-11, 15-17, and 19-22), the device on which the application executes has a touch screen through which a user can interact with the image editing application. However, one of ordinary skill in the art will realize that cursor controllers or other input devices can be used to interact with the controls and applications shown in these examples for other embodiments that execute on devices with cursors and cursor controllers or other input mechanisms (e.g., voice control).

The preceding Summary is intended to serve as a brief introduction to some embodiments as described herein. It is not meant to be an introduction or overview of all subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features as described here are set forth in the appended claims. However, for purposes of explanation, several embodiments are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments described herein provide a novel content publishing application for publishing documents to a content distribution system. The content publishing application in some embodiments includes a publishing tool that guides the application's user through different operations in preparing a document for publication. In some embodiments, these operations include one or more of the following: (1) analyzing the document for errors, (2) specifying a version number for the document, (3) creating a sample document, and (4) exporting the document for publication.

Figure 1:
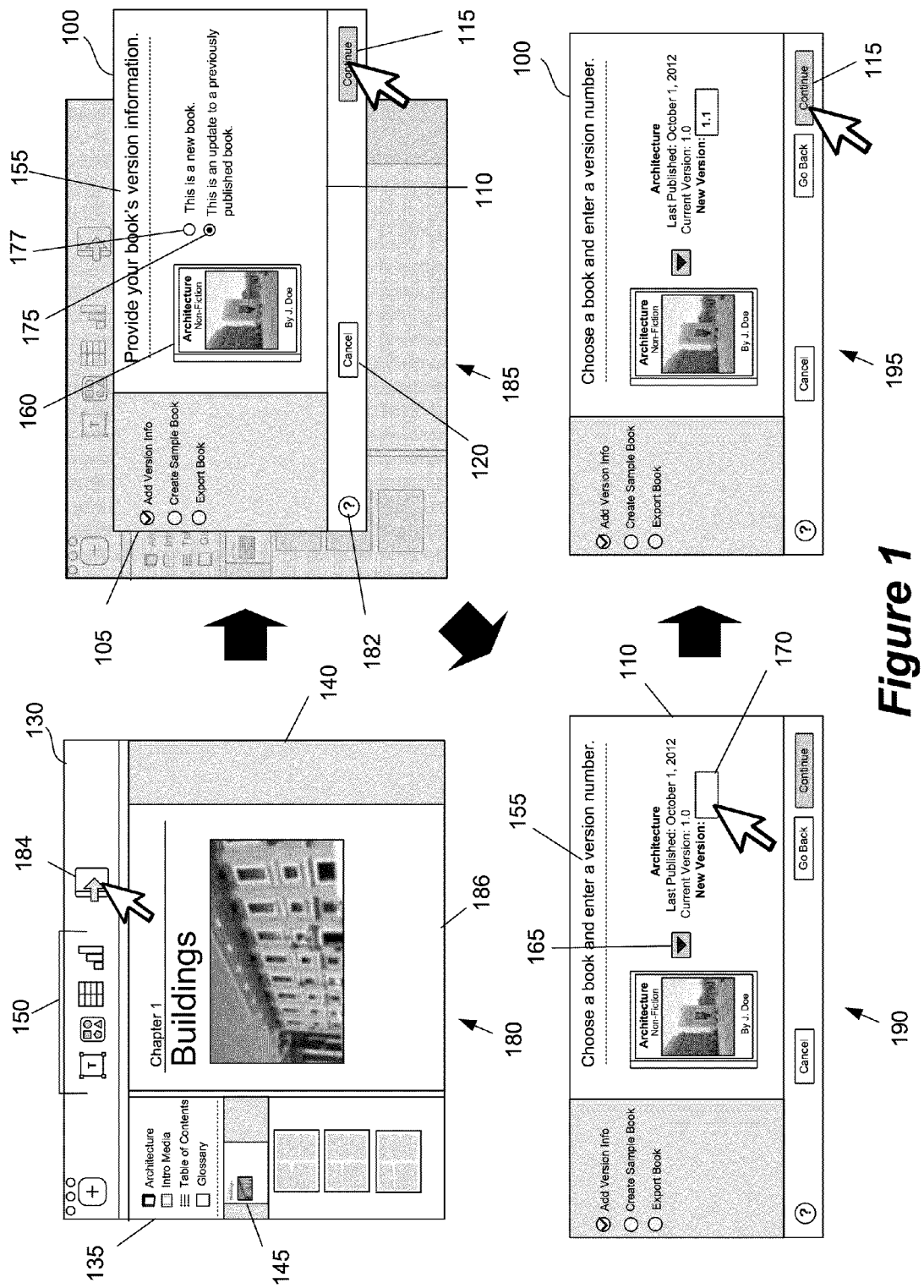
FIG. 1 illustrates a graphical user interface that includes a publishing tool for specifying version information relating to a document and creating a sample document.

For some embodiments, FIG. 1 illustrates a graphical user interface ("GUI") 130 of such a content publishing application. In many of the examples described below, the content publishing application is used to author a book and prepare the book for publication. The content publishing application, in these examples, will be referred to as a book authoring application. However, the content publishing application of some embodiments can be used to create and/or publish other types of content such as a magazine, a comic book, a newspaper, an article, a newsletter, etc.

As shown in FIG. 1, the GUI 130 includes a thumbnail display area 135, a page display area 140, a publish button 184, and a publishing tool 100. The GUI 130 also includes a set of controls 150 for editing a book by adding different items (e.g., text boxes, shapes, tables, charts). The thumbnail display area 135 (also referred to as a side panel) is an area within the GUI 130 through which the application's user can view thumbnail representations of the book's pages. The thumbnails are displayed sequentially starting from the title page to the last page. When the thumbnail display area 135 cannot fit all the pages, the book authoring application provides a scroll bar that can be used to scroll through the pages. Each thumbnail representation is a selectable item in the thumbnail display area 135. At any time, the user can select a thumbnail representation to display the corresponding page in the page display area 140.

The page display area 140 is the main work area for editing different pages of the book that the user is authoring with the application. For example, the user can use this area to write the book, format text, specify a page layout, and add images or other media to the book. When the book is ready for publishing, the user can select the publish button 184 to show the publishing tool 100. The book authoring application of some embodiments provides a menu item and/or implements a shortcut key to activate the publishing tool 100.

In some embodiments, the publishing tool 100 presents a step-by-step guide in preparing the book for publication. In the example illustrated in FIG. 1, the publishing tool guides the user through associating version information to the book, generating a sample book, and exporting the book for publication. The sample book in some embodiments contains a selection of pages from a chapter of the book. Once the book is published, the sample book can be downloaded onto a person's device, so that the person can review it and decide whether to purchase the published book. As will be described in Section III below, the publishing tool of some embodiments guides the user through one or more other steps to prepare the book for publication. For instance, the publishing tool may guide the user through correcting issues that the application discovered when analyzing the book for publication. The publishing tool of some embodiments guides the user into signing into a publishing account and/or creating a new account if the user does not have one.

Figure 2:
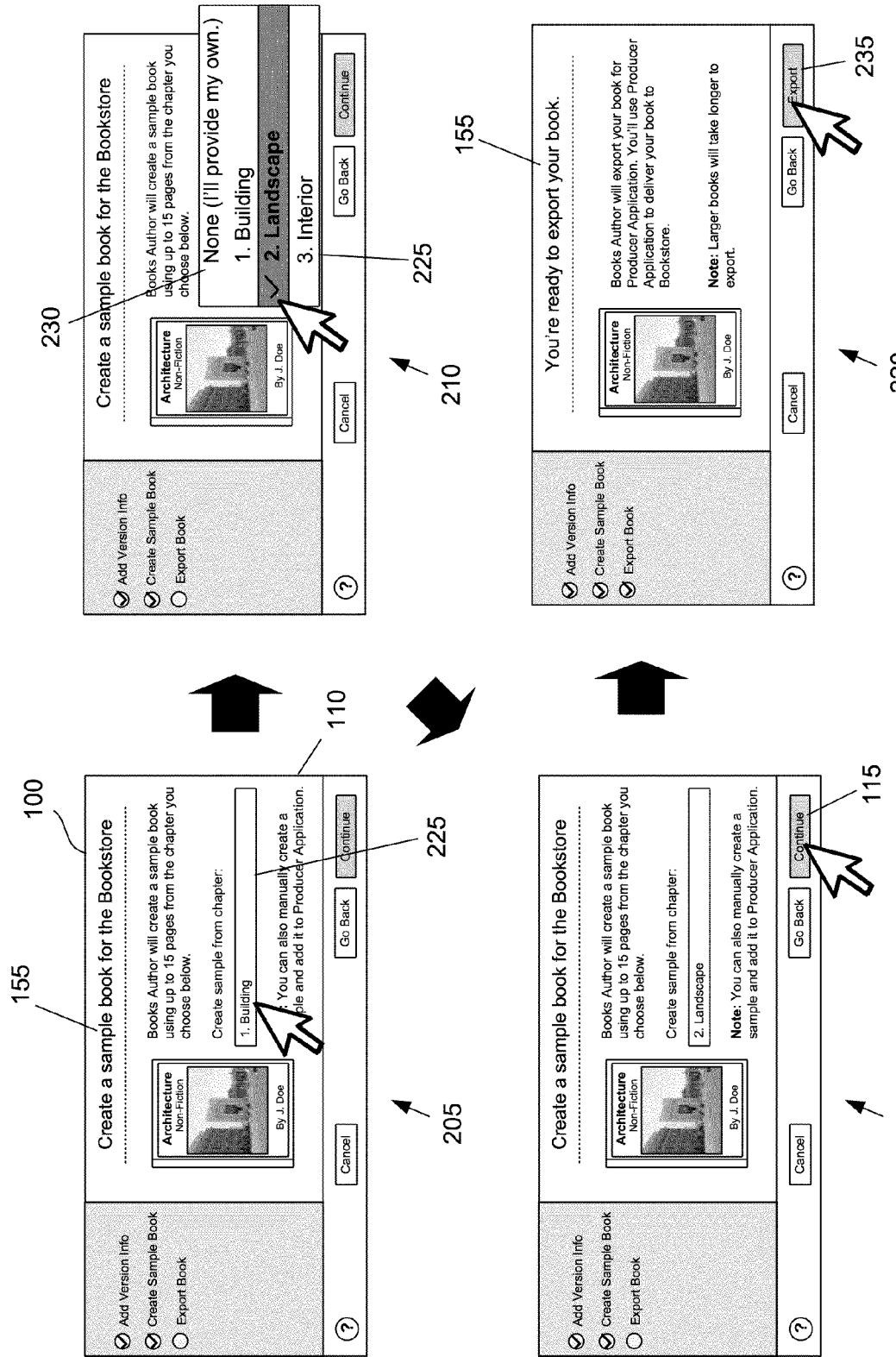
FIG. 2 provides an illustrative example of creating a sample document for publication.

Having described the elements of the GUI 130, the operations of publishing a book to a content distribution system will now be described by reference to different stages of the GUI that are illustrated in FIGS. 1 and 2. Specifically, FIG. 1 illustrates in four operational stages 180-195 how the publishing tool 100 can be used to specify a version number for the book. This is followed by FIG. 2 that continues the series of operations to show how the publishing tool 100 can be used to generate a sample book.

In the first stage 180, the user has written the book using the book authoring application. The thumbnail display area 135 displays thumbnail representations of the book's pages. The thumbnail representation 145 has been selected from the thumbnail display area 135. As such, the book authoring application displays the corresponding page in the page display area 140. To initiate the book publication process, the user selects the publish button 184.

The second stage 185 illustrates the GUI 130 after the user has selected the publish button 184. The selection results in the display of the publishing tool 100. As shown, the publishing tool 100 includes two distinct sections 105 and 110. The section 105 is shown on the left-hand side of the publishing tool 100, while the section 110 is shown on the right-hand side. The section 105 lists a series of different steps that guides the user in exporting the book for publication. The steps include adding version information for the book, creating a sample book, and exporting the book. A marking (e.g., check mark) is displayed next to the current step that is being performed, and each other step that has been completed.

Different from the section 105, the section 110 displays the current step in preparing the book for publication. The section 110 includes a heading 155 that identifies the current step. In the example shown in the second stage 185, the current step is providing version information for the book. The section 110 includes a thumbnail representation 160 of the book. There are also two controls 175 and 177 (e.g., radio buttons) next to the thumbnail representation 160. These controls 175 and 177 are for the user to specify whether the book is a new book or an update to a previously published book.

In some embodiments, the book authoring application automatically selects a particular control (175 or 177) based on the user's publication history. For instance, if the user has not published any books, the application may by default select the control 177, which specifies the book as a new book. On the other hand, if the user has previously published a book, the application may by default select the control 175, which specifies that the book is an update to a previously published book. To retrieve the user's publication history, the application of some embodiments requires that the user to log onto his or her content distribution account (e.g., publishing account).

In the second stage 185, the user has selected the control 175 to specify that the book is an update to a previously published book. To continue with the publishing operations, the user selects the continue button 115. Alternatively, the user can select the cancel button 120 to cancel the operations and return to a previous view (e.g., the one illustrated in the first stage 180). The user can also select the help button 182 to display information on how to publish the book to the content distribution system.

The third stage 190 illustrates the GUI 130 after the user has selected the continue button 115. The selection causes the section 110 to be modified. Specifically, the heading 155 now states that the user should choose a book and enter a version number for the chosen book. The publishing tool 100 includes a selectable item 165 for scrolling through different published books. Each time the user selects a published book through the item 165, the body of the section 110 is updated with information (e.g. the book's title, last publication date, the current version number) relating to the previously published book. In addition, the publishing tool 100 includes a text field 170 for specifying a version number for the chosen book.

As shown in the third stage 190, the information relating to the matching book is listed in the section 110. Specifically, the section 110 displays the title of the book, the last publication date, and the current version number. Here, the user inputs a version number into the text field 170. The fourth stage 195 shows the user selecting the button 115 to continue preparing the book for publication. In some embodiments, the book authoring application prevents the user from associating a version number to the book that is lower than the current version number. For example, if the published book is associated with a version number "1.1", the book authoring application and/or the content distribution system might prevent the updated book being associated with a lower version number (e.g., "1.0", "0.9", etc.).

Once the version information has been inputted, the book authoring application of some embodiments allows the user to choose whether to manually create a sample book or generate a sample book from the full-length book. FIG. 2 provides an illustrative example of choosing the option to generate a sample book. Four operational stages 205-220 are illustrated in this figure. These operations are continuations of the ones illustrated in the previous figure. As shown, the publishing tool's heading 155 states that the next step in preparing the book for publication is creating a sample book. The body of the section 110 states that the book authoring application will create a sample book using up to a predefined number of pages (e.g., 15 pages) from a chapter that is chosen by the user.

A drop-down list 225 is shown on the publishing tool 100. When selected, the drop-down list 225 displays different chapters from the book. The user can select any one of the chapters to create the sample book. In the example illustrated in FIG. 2, the section 110 includes a note that states that the user can also manually create a sample book and add it to a content delivery application (e.g., a producer application). In some embodiments, the content delivery application is an application for adding additional information (e.g., pricing, book category, book description) relating to the book and delivering the book to the content distribution system.

In the first stage 205, the book authoring application has selected by default the first chapter as one that should be used to create the sample book. That is, the book authoring application has analyzed the book (1) to skip over one or more other sections (e.g., the table of contents, preface, about section, etc.), (2) to find the first real chapter of the book, and (3) to present it as the default selection in the drop-down list 225.

As shown, the chapter is listed with its actual chapter title (e.g., name of the chapter) in the drop-down list.

The first stage 205 illustrates the selection of the drop-down list 225. As shown in the second stage 210, the selection results in the display of the book's chapters. The user then selects the second chapter as the one that should be used to create the sample book. Here, the drop-down list 225 includes an option 230 to manually create a sample book. The option 230 is listed as "None (I'll provide my own.)". As will be described in detail below, the user can manually create a sample book (e.g., with the book authoring application) and deliver it to the content distribution system along with the corresponding full version book.

The third stage 215 illustrates the publishing tool 100 after the user has selected the second chapter with the drop-down list 225. The title of the second chapter is shown in the drop-down list 225. The user then selects the continue button 115 to continue with preparing the book for publication.

In the fourth stage 220, the user has stepped through all the different steps in preparing the book for publication. This is indicated by the publishing tool's heading 155, which states that the user is ready to export the book. The user can export the book by selecting the export button 235. In some embodiments, the book is formatted into a particular format that the content distribution system accepts and then exported as one or more files. The book authoring application of some embodiments exports the book as part of a bundle package bundle that includes the book and the sample book. The package bundle may be associated with other items, such as book metadata, cover art, media content, etc.

In some embodiments, the book authoring application is used to create the package bundle, and a separate application (e.g., a content delivery application) is used to input additional information relating to the book and deliver the package bundle to the content distribution system. However, the content authoring application of some embodiments provides a publishing tool to prepare and deliver the book to the content distribution system. In the example illustrated in the fourth stage 220, the body of the section 110 states that the book authoring application will export the book, and a separate content delivery application (e.g., a producer application) will deliver the book to the content distribution system.

Figure 3:
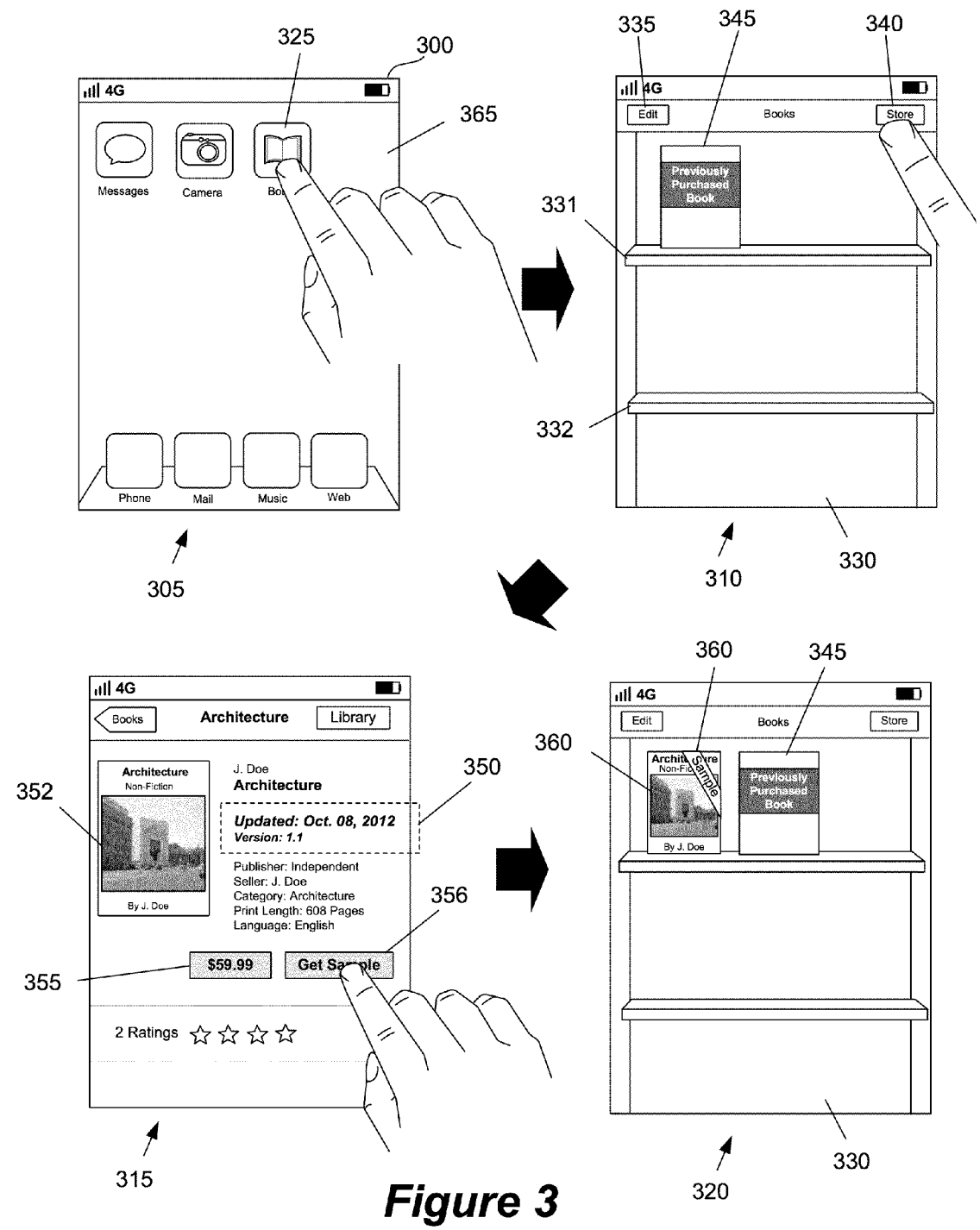
FIG. 3 provides an illustrative example of how a published document appears on a document store of a content distribution system.

Once the book and its associated items are delivered, the content distribution system may review them and publish the book to a digital bookstore. FIG. 3 provides an illustrative example of how a published book appears on the bookstore of the content distribution system. Four operational stages 305-320 of a customer's device 300 are illustrated in this figure. The first stage 305 illustrates the device 300 displaying a GUI 365 of its operating system ("OS"). The GUI 365 includes selectable icons for opening different applications (e.g., messaging application, camera application, web browser, etc.). Several of the icons are displayed along a bar (e.g., a dock), while the remaining icons are displayed on the OS's desktop.

In the first stage 305, the customer selects the icon 325 to open a digital content viewing application. Here, the digital content viewing application is a book application. The second stage 310 illustrates the device 300 after the book application has been opened. The book application's GUI includes a virtual bookshelf 330 with two shelves 331 and 332 for displaying different digital books. For instance, a previously purchased book 345 is shown as sitting on the top shelf 331 with its cover facing forward. Several selectable items are arranged along the top of the bookshelf. These items include an edit button 335 for deleting books or moving the books to another bookshelf, and a store button 340 for opening the digital bookstore.

The second stage 310 shows the customer selecting the store button 340. As shown in the third stage 315, the selection causes the book application to display the digital bookstore. The bookstore displays the published book. The customer might have first searched for the published book using the bookstore. The book is presented in the store with its cover image 352 and metadata. The metadata includes author, title, publisher information, seller information, category, print length (e.g., number of pages), and language. The metadata also includes the book's version number and the date that the book was last updated (350). Below the metadata are two buttons 355 and 356, one 355 for purchasing the book and the other 356 for downloading the sample book.

In the third stage 315, the customer selects the get sample button 356. The fourth stage 320 shows the book application after the selection of the get sample button 356. Specifically, it shows that the sample book 360 has been downloaded from the content distribution system and its visual representation is shown on the top shelf 331. Different from a full version book, the sample book is displayed with a marking (e.g., a tag or a band) that identifies the book as a sample book.

Many more examples of publishing electronic documents are described below. However, before describing these examples, an example content authoring application of some embodiments will be described below in Section I. Section II then describes an example publishing model that is used to publish a book to the content distribution system. This is followed by Section III that describes examples of how an end-user (e.g., a customer) is notified of an update to a book. Section IV then describes examples of creating and viewing a sample book. Next, Section V describes software architecture of an image organizing and editing application of some embodiments. Finally, Section VI describes several example electronic systems that implement some embodiments described herein.

I. Example Content Publishing Application

Figure 4:
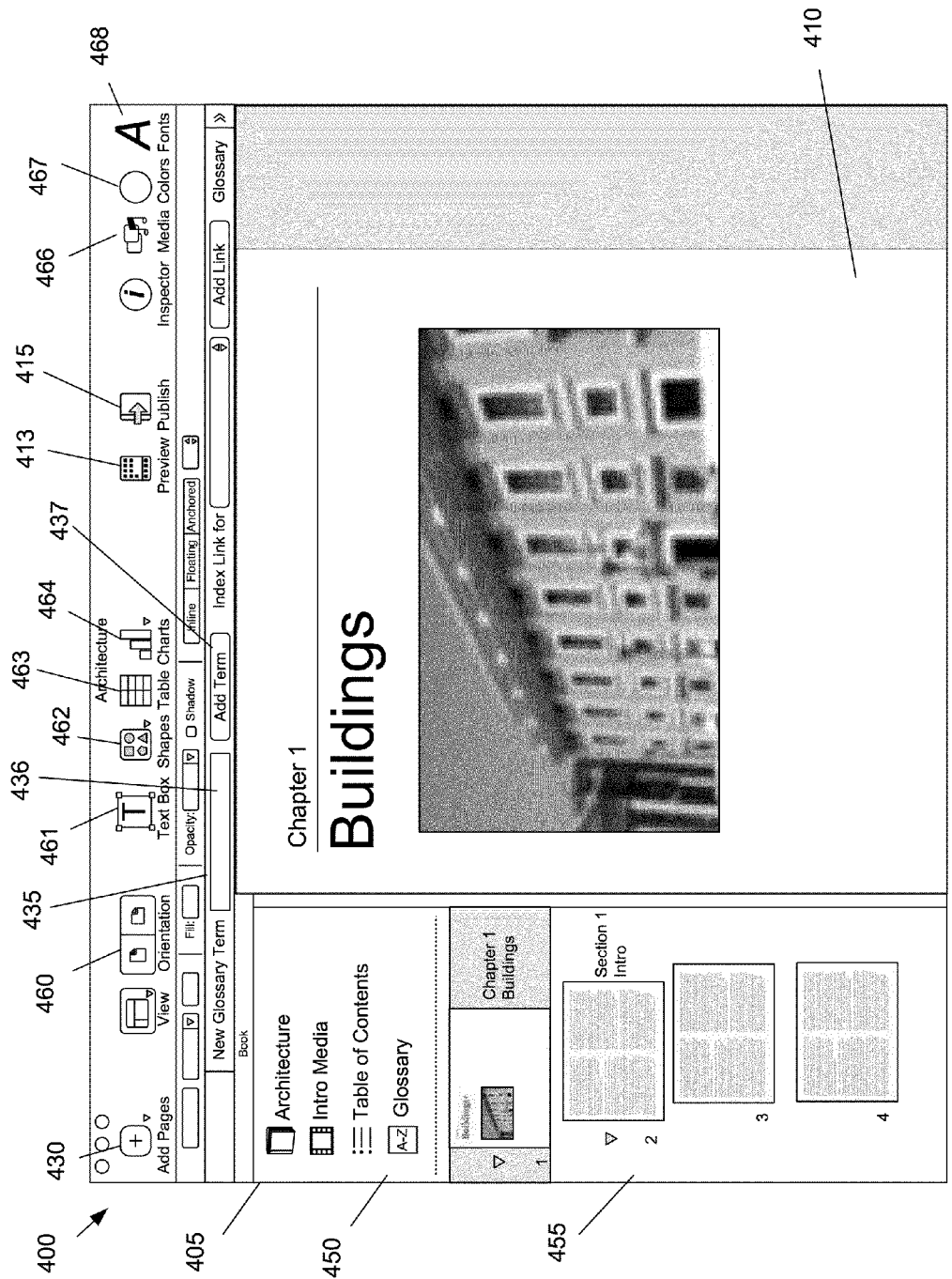
FIG. 4 illustrates a GUI of a content authoring and publishing application.

Many examples of publishing electronic documents will be described below. However, before describing these examples, an example content authoring application of some embodiments will now be described by reference to FIG. 4. FIG. 4 illustrates a graphical user interface ("GUI") 400 of a content authoring application that implements several of the publishing features described herein. As shown, the GUI 400 includes a thumbnail display area 405, a page display area 410, a publish button 415, an add page button 430, a glossary tool 435, a preview tool 413, and a set of editing tools 461-468.

These controls and other aspects (e.g., the sample generation aspect) of the content authoring application are described in U.S. patent application Ser. No. 13/657,838, now published as U.S. Patent Publication 2014-0115449, entitled "Generating Sample Documents", concurrently filed with this application with. Also, these controls and other aspects (e.g., the document versioning aspect) of the content authoring application are described in U.S. patent application Ser. No. 13/657,829, now published as U.S. Patent Publication 2014-0115435, entitled "Creating and Publishing Different Versions of Documents", concurrently filed with this application. These concurrently filed U.S. Patent Applications are incorporated herein by reference.

As mentioned above, the thumbnail display area 405 (also referred to as a side panel) is an area within the GUI 400 through which the application's user can view thumbnail representations of the book's pages. The thumbnails are displayed sequentially starting from the title page to the last page. When the thumbnail display area 405 cannot fit all the pages, the book authoring application provides a scroll bar that can be used to scroll through the pages. Each thumbnail representation is a selectable item in the thumbnail display area 405. At any time, the user can select a thumbnail representation to display the corresponding page in the page display area 410.

In the example illustrated in FIG. 4, the thumbnail display area 405 is segmented into two sections 450 and 455. The first section 450 lists the title page, the introductory media page, the table of contents, and the glossary. In some embodiments, the introductory media is an introductory image that is shown or an introductory video clip that is played when the book is opened. The introductory media may be an audio clip in some embodiments. The application of some embodiments automatically builds the table of contents as the user adds new chapters and/or sections to the book. In some embodiments, the glossary includes definitions to different terms used in the book, links to related glossary terms, and/or an index to where the terms appear in the book.

As shown in FIG. 4, the section 455 lists the remaining pages of the book that a user is authoring with the application. The section 455 may also be referred to as a document hierarchy. This is because it presents the pages in a hierarchical manner (e.g., starting with the first page of the chapter in the thumbnail display area 405, a section page that is slighted indented therein, and the remaining pages that are event more indented therein). In some embodiments, the application provides a selectable item to collapse a hierarchical level. For example, the application might provide a selectable item to only show the first page of the chapter and hide the remaining pages of the chapter in the thumbnail display area 405. The application of some embodiments allows the user to switch the thumbnail display area 405 from the thumbnail view to an outline view that presents an outline of the book.

The page display area 410 is a main work area for editing different pages of the book. For example, the user can use this area to write the book, format text, specify a page layout, and add images or other media to the book. Similar to a conventional word processing application, the user can also cut and paste text, drag text around, etc.

The application of some embodiments provides a variety of different tools to edit the book. Once such editing tool is an add page button 430 for adding additional pages to the book. In some embodiments, the selection of the add page button 430 causes the application to display different types of pages that the user can add to the book. Examples of such types of pages include a new chapter page, a preface, a section page, a copyright page, a dedication page, and a forward page. The pages may include different page layouts (e.g., one column layout, two-column layout) for the same type of page. The layout and/or design of the page are based on one of several different book templates. The application of some embodiments provides several different pre-designed templates from which the user can choose to create the new book. Each template may include the title page, the introductory media page, the table of contents, and the glossary.

As shown in FIG. 4, the application provides several other tools to edit a book. For example, the user can use the orientation tool 460 to switch a book's page between a landscape orientation and a portrait orientation. In addition, the user can select (1) a text box tool 461 to add a text box to a page, (2) a shape tool 462 to add different shapes (e.g., circles, arrows, stars, etc.), (3) a table tool 463 to add tables, (4) a chart tool 464 to add different types of charts (bar charts, pie charts, etc.), and (5) a media tool 466 to add images, video clips, and audio clips. The GUI 400 also includes a font tool 468 for selecting a font for the book's text and a color tool 467 for selecting the color of the text.

The glossary tool 435 can be used to add terms to the glossary. The glossary tool 435 includes a text field 436 for inputting a term (e.g., one or more words) and an add button 437 to add the inputted term to the glossary. Alternatively, the user can select a term from a book's page to automatically fill in the text field. As mentioned above, the glossary of some embodiments includes definitions to different terms used in the book, links to related glossary terms, and/or an index to where the terms appear in the book. Accordingly, each glossary term may be associated with a particular page where that term appears in the book. Each term in the glossary is a selectable item that when selected causes the digital book to display the page that includes that term.

The preview tool 413 is a tool within the GUI that allows the user to preview the book on another device (e.g., a tablet). For example, the user can connect the device to the computer and open the content viewing application. In some embodiments, the selection of this tool causes the application to display a list of connected devices. The user can then select a particular device to display a preview of the book on that particular device.

One or ordinary skill in the art will also recognize that different display areas shown in the GUI 400 is one of many possible configurations for the GUI of some embodiments. For instance, some embodiments allow the user to modify the size of the various display areas within the GUI 400. In addition, the application of some embodiments might provide different sets of controls. For example, the application might not provide tools to add text boxes, tables, and/or charts. The application of some embodiments might not provide any editing tool but may only provide tools to prepare and deliver electronic documents.

II. Publication Model

The content authoring application of some embodiments implements a publication model to prepare a document for publication and to publish the document to a content distribution system. An example workflow of preparing and publishing a document will now be described by reference to FIGS. 5-11. These figures illustrate a series of example operations to publish a book to the content distribution system. These operations include (1) performing a pre-publish check of the book, (2) signing in to a distribution account, (3) adding version information, (4) creating a sample book, (5) exporting the book, and (6) delivering the exported book and its associated items to the content distribution system. These figures are followed by FIGS. 12-14 that conceptually illustrate several example processes that the application uses to prepare a document for publication.

A. Example Publication Workflow

Figure 5:
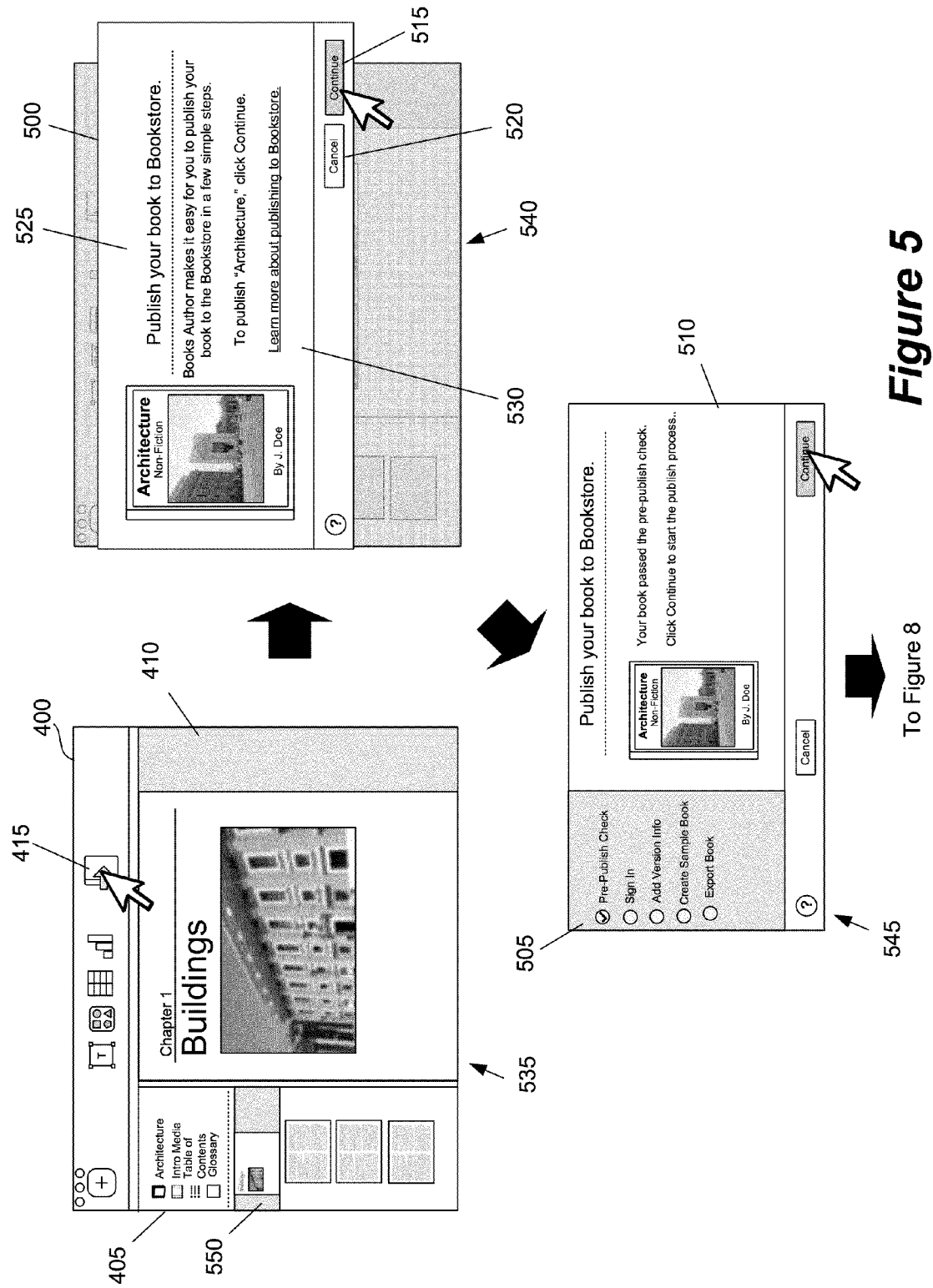
FIG. 5 provides an illustrative example of opening a publishing tool.

In some embodiments, the content authoring application provides a publishing tool that guides a user through different operations in preparing a document (e.g., book, newspaper, comic book, magazine, newsletter, etc.) for publication. FIG. 5 provides an illustrative example of opening such a publishing tool. Three operational stages 535, 540, and 545 of the application's GUI 400 are shown in this figure. The application is the same as the one described above by reference to FIG. 4.

In the first stage 535, the user has written the book using the application. The thumbnail display area 405 displays thumbnail representations of the book's pages. The thumbnail representation 550 has been selected from the thumbnail display area 405. As such, the application displays the corresponding page in the page display area 410. To initiate the book publication process, the user selects the publish button 415.

The second stage 540 illustrates the GUI 400 after the user has selected the publish button 415. The selection results in the display of the publishing tool 500. As shown, the publishing tool 500 includes a thumbnail representation of the book's cover page. The publishing tool also displays text 530 relating to the publication process. Specifically, the heading 525 indicates the purpose of the publishing tool, which is to publish the document to the content distribution system's bookstore. The body of the text 530 states that the application makes it easy to publish the book to the bookstore following a few simple steps. The text 530 also states that the user should select the continue button to publish the book. The publishing tool 500 also provides a link to a webpage where the user can learn more about publishing to the bookstore. As shown in the second stage 540, the user selects the continue button 515. Alternatively, the user can select the cancel button 520 to cancel the operations and return to a previous view (e.g., the one illustrated in the first stage 535).

The third stage 545 illustrates the GUI 400 after the user has selected the continue button 515. As shown, the publishing tool 500 now includes two distinct sections 505 and 510. The section 505 is shown on the left-hand side of the publishing tool 500, while the section 510 is shown on the right-hand side. The section 505 lists a series of different steps that guide the user in exporting the book for publication. The steps include performing a pre-publish check of the book, signing in to a distribution account, adding version information, creating a sample book, and exporting the book.

In the example illustrated in the third stage 545, the body of the section 510 states that the book passed the pre-publish check. In some embodiments, the application analyzes a document to check whether the document is ready for publication. The analysis may entail searching for one or more of the following errors: missing file, missing fonts, invalid equations, empty equations, and problems with media optimization. Some of these errors are blocking errors that must be resolved prior to proceeding with the publication process, while others are non-blocking errors that do not need to be resolved in order to continue the publication process.

Figure 6:
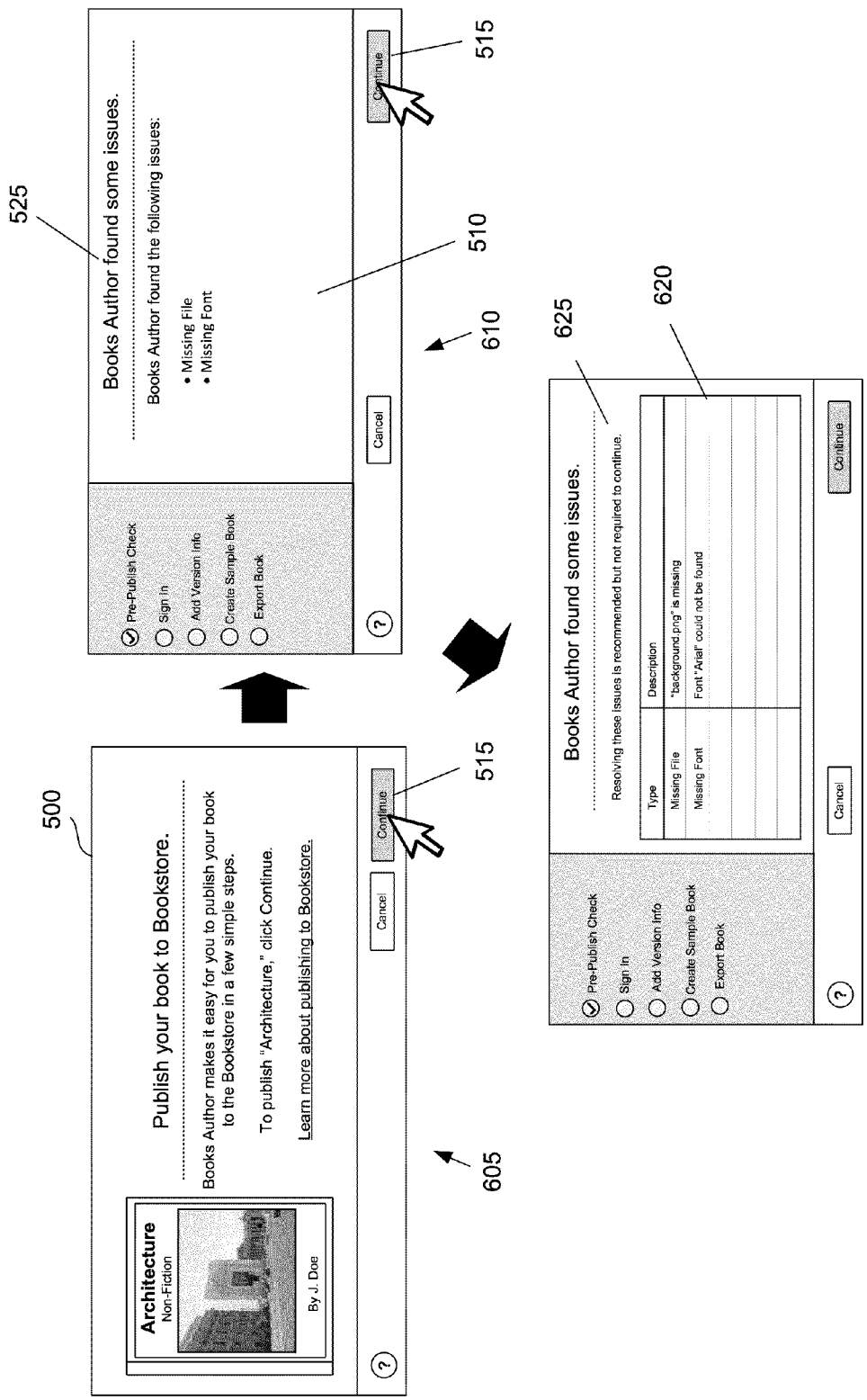
FIG. 6 provides an illustrative example of how an application presents non-blocking errors.

FIG. 6 provides an illustrative example of how the application presents non-blocking errors. Three operational stages 605, 610, and 615 of the application are shown in this figure. In the first stage 605, the application displays the initial display area of the publishing tool 500. As shown, the user selects the continue button 515 to continue with the publication process.

The second stage 610 illustrates the publishing tool 500 after the selection of the continue button 515. Here, the application has analyzed the book and found several non-blocking errors. This is indicated by the heading, which states that the application has found some issues. The errors are listed by their types in the body of the section 510 as "missing file" and "missing font". In the second stage 610, the user selects the continue button 515.

The third stage 615 illustrates the publishing tool 500 after the selection of the continue button 515. As shown, the selection causes the application to display detailed information regarding the errors. The errors are listed in a two-column table 620, with the first column's heading being the error type and the second column's heading being the description. The description for the missing file error states that an image file is missing. The description for the missing font error states that a particular font could not be found. In some embodiments, the items in the table 620 are selectable items. For instance, when an item is selected, the application may show a page of the book where the corresponding error was found.

In the example illustrated in FIG. 6, the application has analyzed the book and discovered the non-blocking errors. This is indicated by the note 625 placed above the table 620, which states that resolving these issues is recommended but not required to continue. Hence, the user can select the continue button to step through the publication process.

Figure 7:
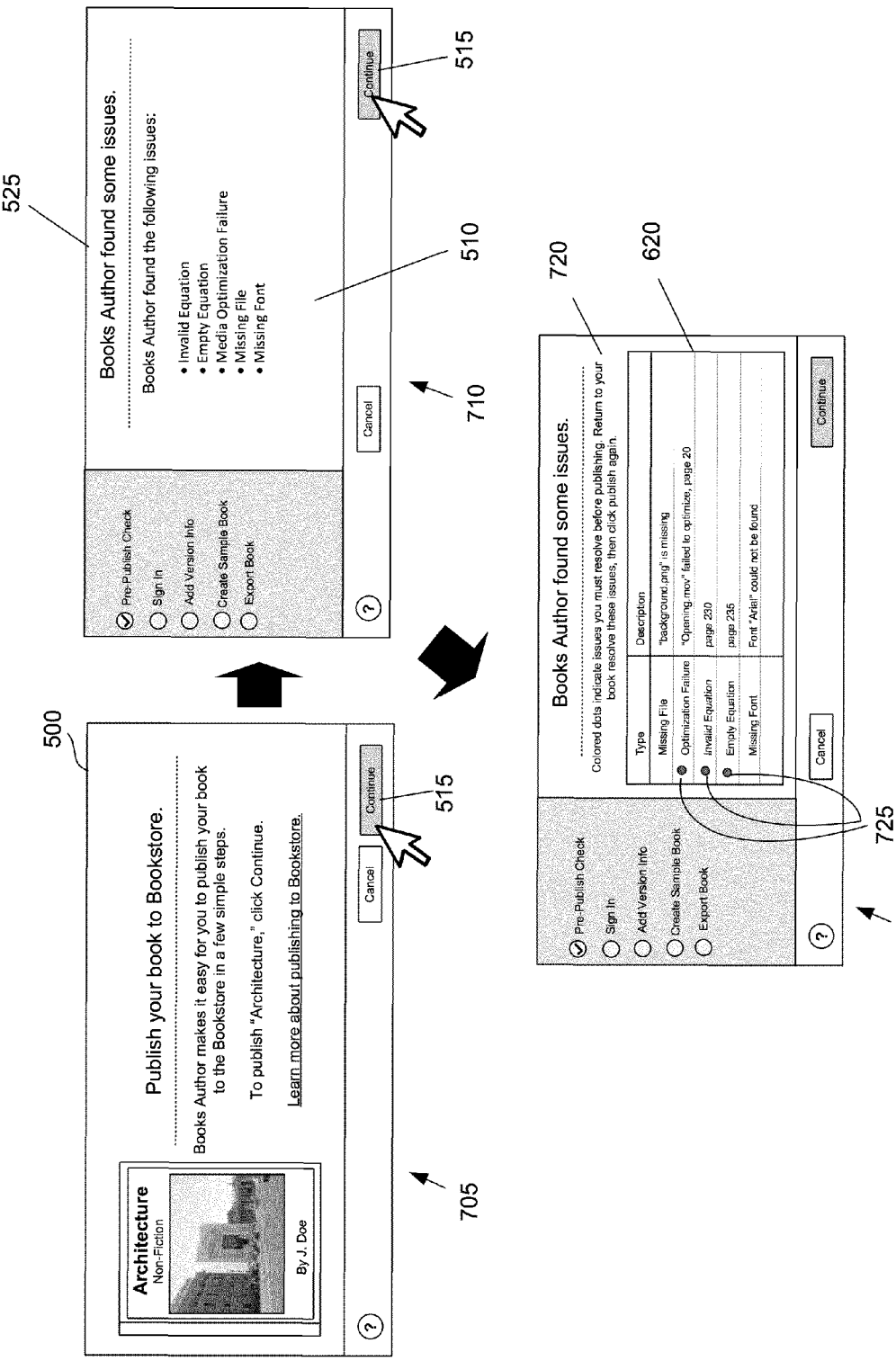
FIG. 7 provides an illustrative example of how an application presents blocking errors.

FIG. 7 provides an illustrative example of how the application presents blocking errors. Three operational stages 705-715 of the application are shown in this figure. In the first stage 705, the application displays the initial display area of the publishing tool 500. As shown, the user selects the continue button 515 to continue with the publication process.

The second stage 710 illustrates the publishing tool 500 after the selection of the continue button 515. Here, the application has analyzed the book and found several non-blocking as well as blocking errors. This is indicated by the heading, which states that the application has found some issues. The errors are listed by their types in the body of the section 510 as "invalid equation", "empty equation", "media optimization failure", "missing file", and "missing font". In the second stage 710, the user selects the continue button 515.

The third stage 715 illustrates the publishing tool 500 after the selection of the continue button 515. As shown, the selection causes the application to display detailed information regarding the errors. The errors are listed in a two-column table 620, with the first column's heading being the error type and the second column's heading being the description. The description for the missing file error states that an image file is missing. The description for the missing font error states that a particular font could not be found. The descriptions for the invalid and empty equations errors indicate the page numbers where those equations are found. The description for the optimization failure error states that a video clip has failed to optimize. The description also indicates the page number where the video clip was added.

In some embodiments, the optimization error is shown because of the size of the media clip and/or the format of the media clip. For example, the content distribution system may place restriction on the size of an electronic document. In such case, when a video clip places an electronic document over the size limit, the application may display the optimization error message.

The third stage 715 also illustrates that the application differentiates non-blocking errors from blocking errors. Specifically, the blocking errors are listed in the table 620 with a marking 725 (e.g., a colored dot). This is indicated by the note 720 above the table 620, which states that the markings indicate issues that the user must resolve prior to publishing the book. The note 720 also states that the user should first resolve these issues, and then select the publish button (not shown) again. When there are one or more blocking errors, the application of some embodiments disables or does not show the continue button 515.

Figure 8:
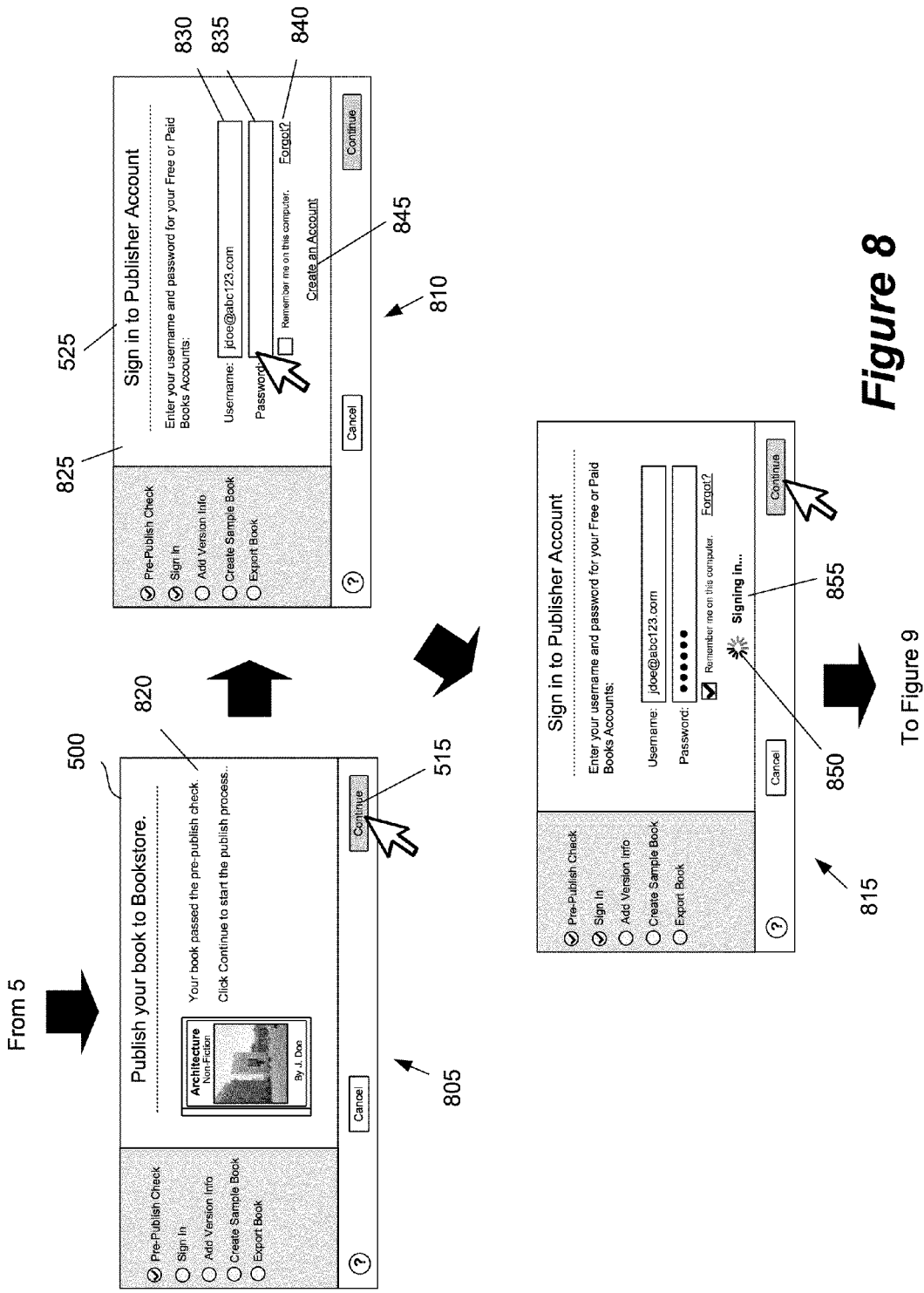
FIG. 8 provides an illustrative example of signing in to a distribution account.

When there are no blocking errors, the application of some embodiments allows the user to continue with preparation of the book for publication. FIG. 8 provides an illustrative example of signing in to a distribution account. Three operational stages 805-815 of the publishing tool 500 are illustrated in this figure. These operations are continuations of the ones illustrated in FIG. 5.

In the first stage 805, the publishing tool 500 displays a message 820, which states that the book has passed the pre-publish check. The message 820 also states that the user should select the continue button to start the publication process. To start the process, the user selects the continue button 515.

As shown in the second stage 810, the selection of the continue button 515 causes the publishing tool 500 to display a login sheet 825 for signing in to the user's distribution account. This is indicated by the heading 525, which states that the user should sign in to the distribution account (e.g., the publisher account). The login sheet 825 includes a username field 830 for inputting a username (e.g., an email address associated with the user) and a password field 835 for inputting a password. The login sheet 825 also includes a link 840 to a webpage for retrieving a forgotten username and/or password.

In the example illustrated in FIG. 8, the login sheet 825 also includes a link 845 to a webpage for creating a distribution account. In some embodiments, the content distribution system allows an entity (e.g., a person, a company, an organization) to create a paid distribution account and/or a free distribution account. The paid account allows the entity to sell books and offer books for free on the content distribution system's bookstore. The paid account might require the entity to provide banking and tax information in order for the entity to receive payment. Different from the paid account, a free distribution account allows the entity to offer books for free in the bookstore.

In the second stage 810, the user inputs the username into the username field 830. The third stage 815 illustrates the publishing tool 500 after the user has inputted a password into the password field 835. After inputting the password, the user selects the continue button 515 to sign in to the distribution account. The publishing tool 500 shows a spinner 850 and text 855, which indicate that the application is attempting to sign in to the account.

Figure 9:
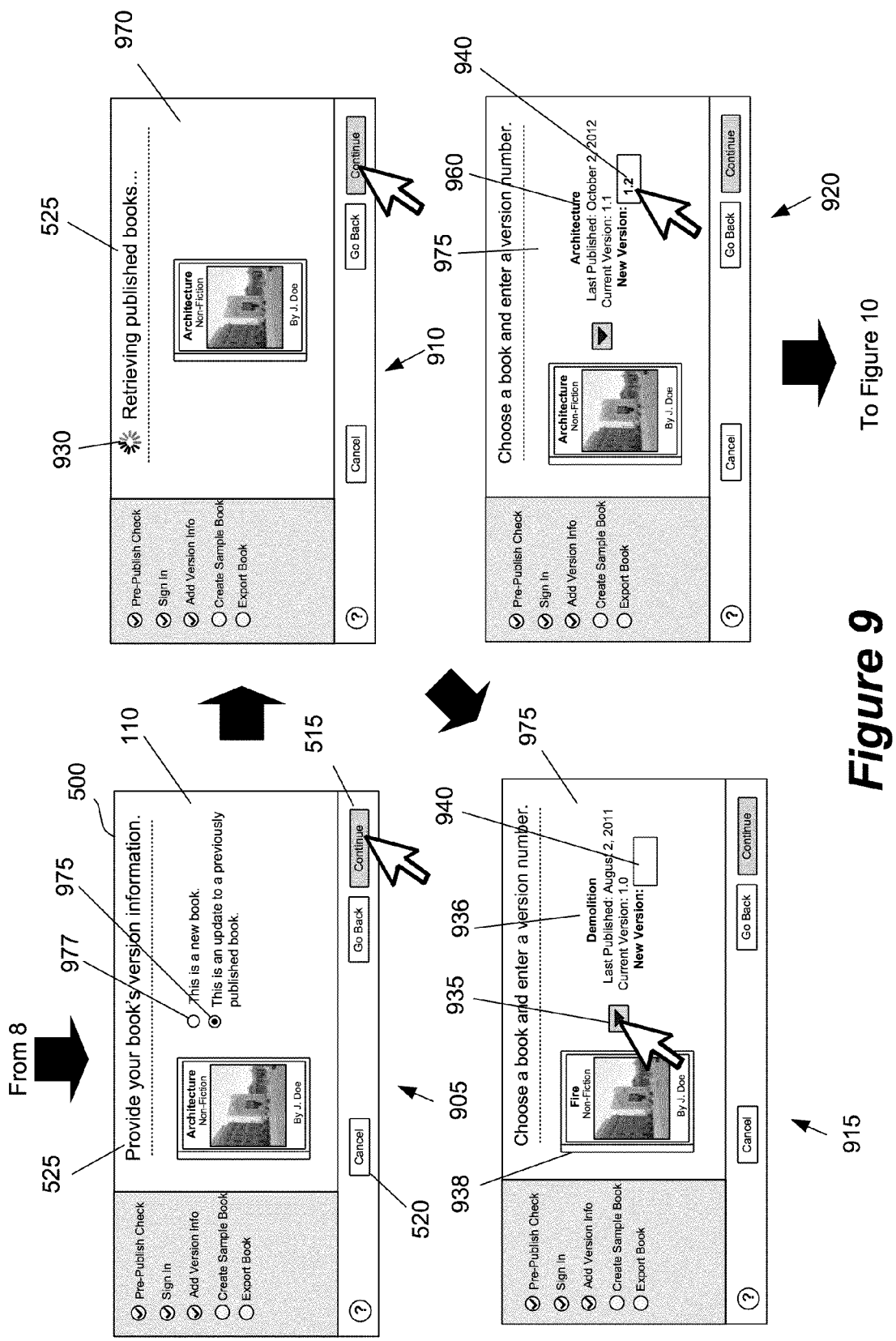
FIG. 9 provides an illustrative example of defining a document as an update to a previously published document.

Once the user has signed in, the application of some embodiments allows the user to specify whether the book is a new book or an update to a previously published book. FIG. 9 provides an illustrative example of defining the book as an update to a previously published book. Four operational stages 905-920 of the publishing tool 500 are illustrated in this figure. These operations are continuations of the ones illustrated in FIG. 8.

In the first stage 905, the publishing tool 500 is displaying a sheet 110 to specify whether the book is a new book or an update to a previously published book. The sheet 110 includes a heading 525, which identifies the current step as providing version information for the book. There are also two controls 977 and 975 (e.g., radio buttons) below the heading 525. These controls 977 and 975 are for the user to specify whether the book is a new book or an update to a previously published book. As mentioned above, the application of some embodiments automatically selects a particular control (977 or 975) based on the user's publication history and sets that control as the default control. For instance, if the user has not published any books, the application may by default select the control 977, which specifies the book as a new book. On the other hand, if the user has previously published a book, the application may by default select the control 975, which specifies that the book is an update to a previously published book.

In the first stage 905, the control 975 has been pre-selected by the application based on the user's publication history. To continue with the publishing operations, the user selects the continue button 515. Alternatively, the user can select the cancel button 520 to cancel the operations and return to the sign in sheet (not shown).

The second stage 910 illustrates the publishing tool 500 after the user has selected the continue button 515. The selection causes the application to display a sheet 970, which indicates that the application is attempting to retrieve a list of published books from the content distribution system. The sheet 970 is displayed with a marking 930 (e.g., a spinner) that provides a visual indication to the user that the application is awaiting response from the content distribution system.

The third stage 915 illustrates the publishing tool 500 after the application has retrieved the list of published books. As shown, the publishing tool 500 displays a sheet 975 to select a published book and enter a version number for the book. The sheet 975 includes a selectable item 935 for scrolling through different published books. Each time the user selects the item 935, the body of the sheet 975 is updated with information (e.g. the book's title, last publication date, current version number) relating to a previously published book. In addition, the sheet 975 includes a text field 940 for specifying a version number for the chosen book.

As shown in the third stage 915, the publishing tool 500 displays information relating to a different book than the one the user is trying to publish. This is shown in the sheet 975, as the title 936 shown on the body of the sheet does not match the one shown on the book's thumbnail representation 938. Here, the user selects the item 935 to scroll to another previously published book.

As shown in the fourth stage 920, the information relating to the matching book is listed in the body of the sheet 975. Specifically, the sheet 975 displays the title of the book 960, the last publication date, and the current version number. As the matching book is listed, the user inputs a version number into the text field 940. In some embodiments, the application prevents the user from associating a version number that is lower than the current version number to the book. For example, if a book is associated with a version number "1.1", the application and/or the content distribution system might prevent the book from being associated with a lower version number (e.g., "1.0", "0.9", etc.).

Figure 10:
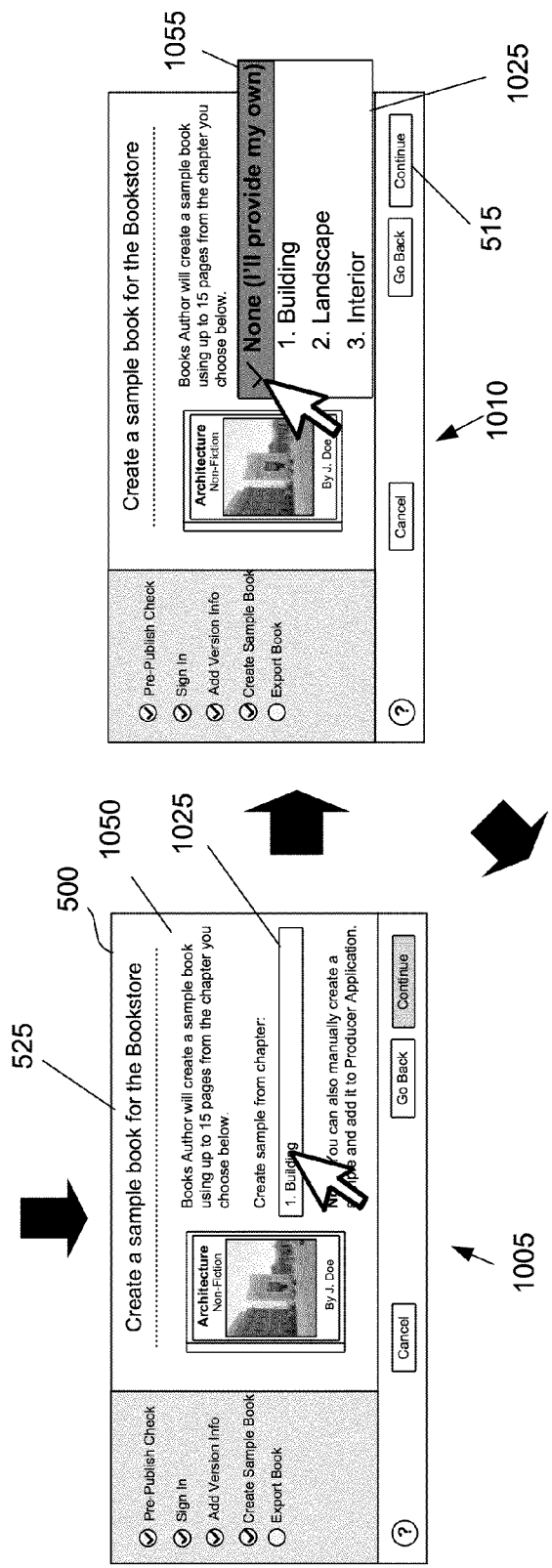
FIG. 10 provides an illustrative example of selecting an option to manually create a sample document for publication.
Figure 10:
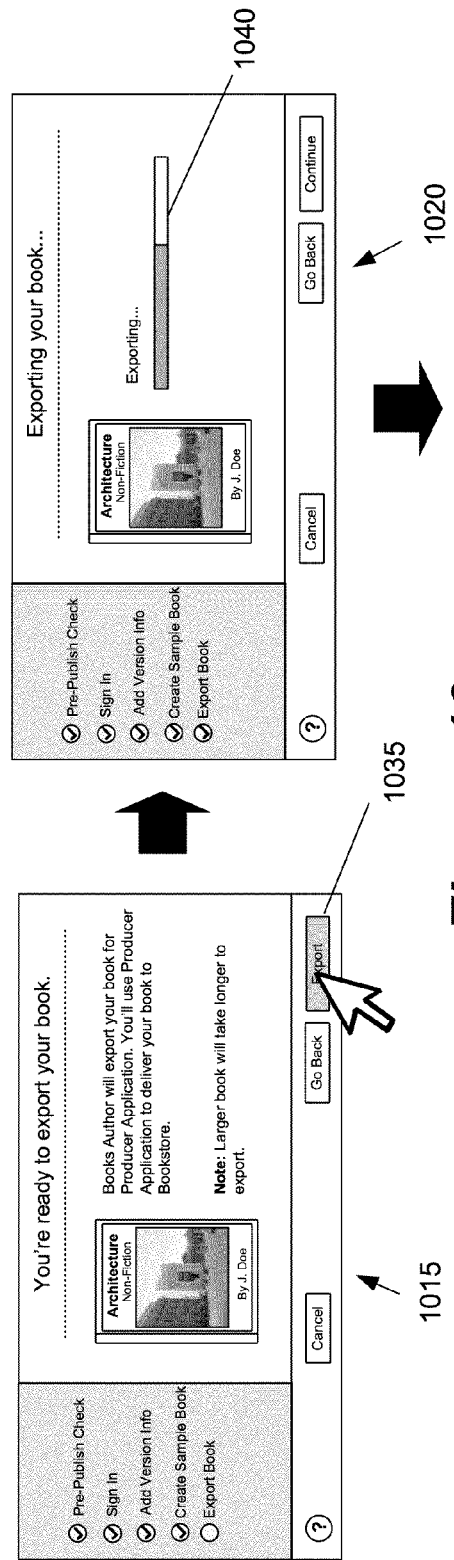

In some embodiments, the application allows the user to choose whether to automatically create a sample book or manually create the sample book. FIG. 10 provides an illustrative example of selecting an option to manually create a sample book for publication. Four operational stages 1005-1020 are illustrated in this figure. These operations are continuations of the ones illustrated in the previous figure.

In the first stage 1005, the publishing tool 500 displays a sheet 1050 for creating a sample book. The sheet 1050 includes a heading 525 that identifies the current step as creating a sample book for the bookstore. The body of the sheet 1050 states that the application will create a sample book using up to a predefined number of pages (e.g., 15 pages) from a chapter of the book that is chosen by the user. The sheet 1050 also includes a drop-down list 1025. When selected, the drop-down list 1025 displays different chapters from the book. The user can select any one of the chapters to create the sample book.

As shown in the first stage 1005, the application has selected by default the first chapter as one that should be used to create the sample book. That is, the application has analyzed the book to skip over one or more sections (e.g., table of contents, preface, about section, etc.) to find the first real chapter of the book, and to present it as the default selection in the drop-down list 1025. The selected chapter is listed with its actual chapter title in the drop-down list 1025.

The first stage 1005 illustrates the selection of the drop-down list 1025. As shown in the second stage 1010, the selection results in the display of the book's chapters. The drop-down list 1025 also includes an option 1055 to manually create a sample book. The option 1055 is listed as "None (I'll provide my own.)". In the second stage 1010, the user selects the option 1055 to manually create the sample book.

The third stage 1015 illustrates the publishing tool 500 after the user has selected the manual option 1055 from the drop-down list 1025 and the continue button 515. Now the user has stepped through all the different steps in preparing the book for publication. This is indicated by the publishing tool's heading 525, which states that the user is ready to export the book. As shown, the user selects the export button 1035 to export the book for publication.

The fourth stage 1020 illustrates the publication tool after the user selects the export button. The publishing tool displays a message stating the book is being exported. In addition, the progress of the export operation is shown by the progress bar 1040. In some embodiments, the book is exported as part of a bundle package that includes the book and the sample book. The package bundle may be associated with other items, such as book metadata, cover art, media content, etc.

Figure 11:
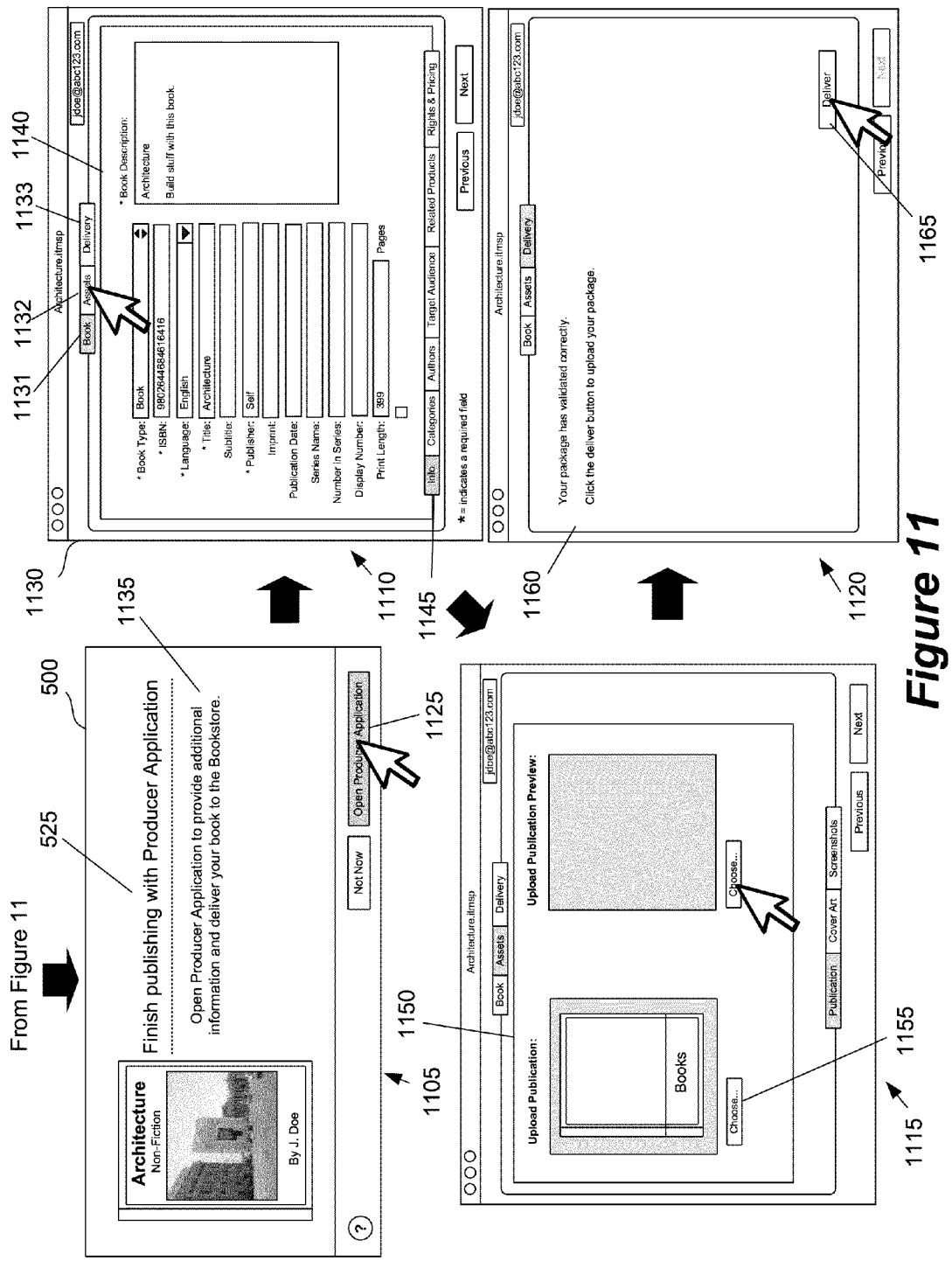
FIG. 11 provides an illustrative example of how a content authoring application interfaces with a content delivery application to deliver the prepared document and its associated items to a content distribution system.

In some embodiments, the content authoring application is used to create the package bundle, and a separate application is used to input additional information relating to the book and to deliver the package bundle to the content distribution system. FIG. 11 provides an illustrative example of how the content authoring application interfaces with a content delivery application to deliver the prepared book and its associated items to the content distribution system. Four operational stages 1105-1120 are illustrated in this figure. These operations are continuations of the ones illustrated in the previous figure.

In the first stage 1105, the publishing tool 500 displays a sheet 1135 that provides information on completing the publication process. Specifically, the heading 525 indicates that the user should finish the publishing with the content delivery application. The content delivery application is referred to in this figure as a "Producer Application". The body of the sheet 1135 states that the user should open the producer application to provide additional information and to deliver the book to the bookstore. The publishing tool 500 includes a button 1125 that when selected opens the content delivery application.

The first stage 1105 also illustrates the selection of the button 1125. The selection of this button causes the content delivery application to be opened. Specifically, the content authoring application has created a package bundle (e.g., package file) that includes the book and its associated items, and the content delivery application has opened that package bundle.

As shown in the second stage 1110 of FIG. 11, the content delivery application includes a GUI 1130. The GUI includes a number of tabs 1131-1133 that are arranged on top of a display area 1140. These tabs include a book tab 1131 for inputting book information, an asset tab 1132 for inputting asset information (e.g., book files, cover art, screenshots), and a delivery tab 1133 for delivering the package bundle to the content distribution system.

In the second stage 1110, the book tab 1131 has been selected. Hence, the display area 1140 displays different fields for inputting information related to the book. The fields include (1) book type (e.g., book, textbook), (2) International Standard Book Number ("ISBN"), (3) language, (4) title, (5) subtitle, (6) publisher, (7) imprint, (8) publication date, (9) series name, (10) number in series, (11) display number, and (12) print length (e.g., pages). One or more of these fields (e.g., title, print length) may be pre-populated based on the book that is being published. Several of these fields are required for publishing the book. In some embodiments, the content delivery application provides a field to input a version number. The content delivery application may also include a field to input an update date.

In the example illustrated in the second stage 1110, the GUI 1130 includes several tabs 1145 that are arranged along the bottom of the display area 1140. Any one of these tabs can be selected to input other information related to the book. For example, the GUI includes a Categories tab to input category information for the book, an Authors tab to input author information, a Target Audience tab to input target audience information, a Related Products tab to input related products information, and a Rights and Pricing tab to input rights and pricing information.

In the second stage 1110, the user selects the asset tab 1132. As shown in the third stage 1115, the selection causes the display area 1140 to display an asset menu. With this menu, the user can select (1) a book for publication, (2) a sample book, (3) cover art, and (4) screenshots. In some embodiments, the screenshots are images that are shown along with the book on the content distribution systems' bookstore. Here, the upload area 1150 shows that the book has been selected for publication. The user does not have to manually choose a publication file (e.g., a book file) using the choose button 1155. However, the upload area 1150 shows that the sample book has not been selected for publication. This is because the user opted to create the sample book manually.

The fourth stage 1120 illustrates the GUI 1130 after the user has chosen a sample book file and selected the delivery tab 1133. As shown, the content delivery application has presented a delivery sheet 1160. The delivery sheet 1160 includes text that states the book package has been validated, and that the user should select the deliver button to upload the package to the content distribution system. In some embodiments, the delivery sheet 1160 displays a list of additional information that must be inputted prior to delivering the package. In the fourth stage 1120, the user selects the deliver button 1165 to upload the complete publication package to the content distribution system. Once the content distribution system receives the package, the system may review the package and then publish the book on its bookstore.

B. Example Processes

In the examples described above, the content authoring application performs a number of different operations to prepare a document for publication. These operations include performing a pre-publish check of the document, signing in to a distribution account, adding version information, creating a sample document, and exporting the document. Several example processes for publishing a document will now be described by reference to FIGS. 12-14.

1. Publication Process

Figure 12:
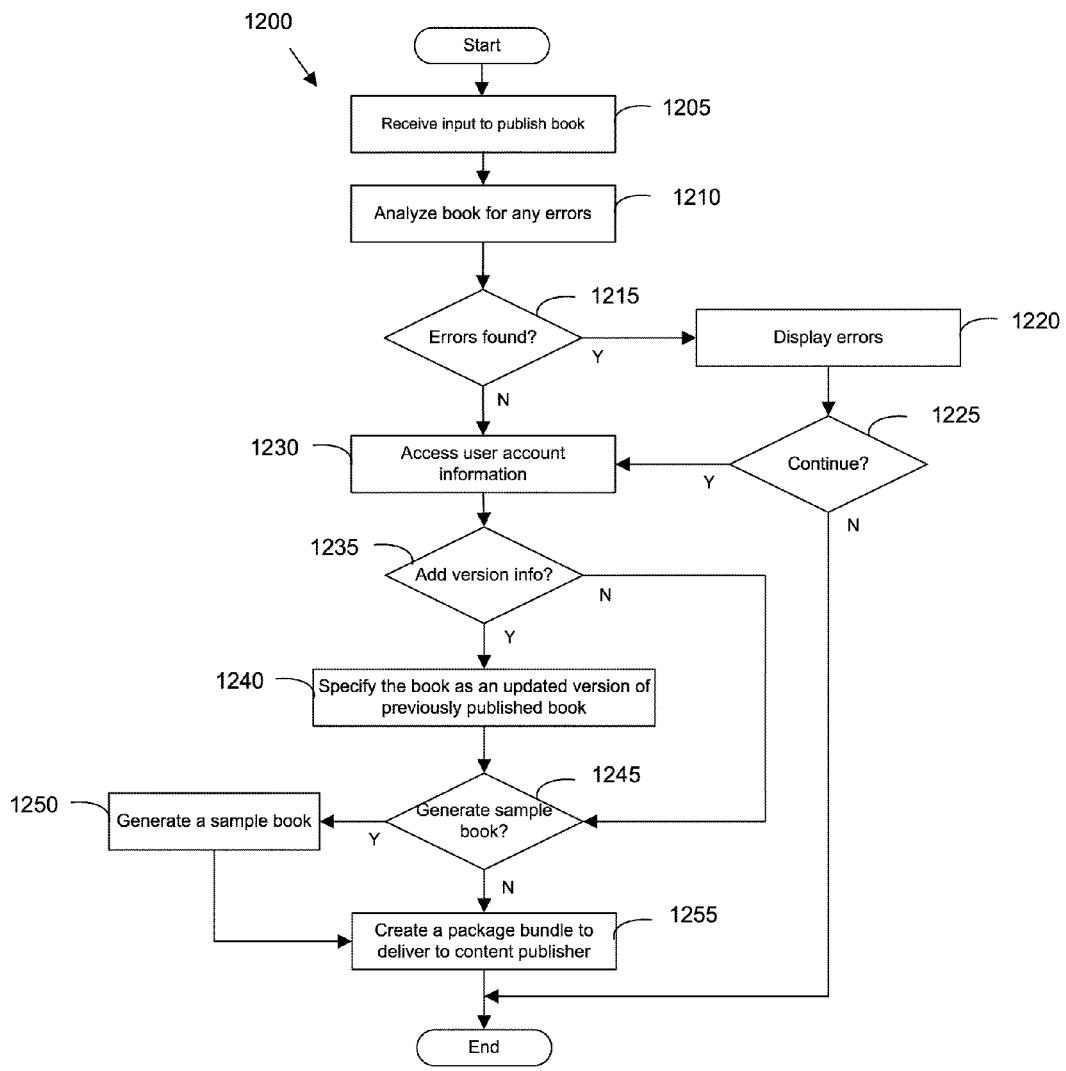
FIG. 12 conceptually illustrates a process performed by some embodiments to publish a document to a content distribution system.

FIG. 12 conceptually illustrates a process 1200 performed by some embodiments to publish a document to the content distribution system. In some embodiments, the process 1200 is performed by the content authoring application. As shown, the process 1200 begins when it receives (at 1205) an input to publish a book. For example, the process might receive this input through a selectable user interface item (e.g., the publish button, a menu item). The process 1200 then analyzes (at 1210) the book for any errors. Several examples of analyzing a book for errors are described above by reference to FIGS. 6 and 7. In addition, an example process for analyzing a book will be described below by reference to FIG. 13.

At 1215, the process 1200 determines whether there are any errors. When there are no errors, the process 1200 proceeds to 1230, which is described below. Otherwise, the process 1200 displays (at 1220) those errors. In displaying the errors, the process 1200 might differentiate errors that require corrections from other errors that do not require corrections. In the example shown in FIG. 7, each error that requires correction is shown with a flag or a marking (e.g., a dot).

Returning to FIG. 12, the process 1200 determines (at 1225) whether to continue preparing the book for publication. If the process 1200 determines (at 1225) not to continue, the process ends. For example, the user might choose to correct the errors, or the application may require the user to correct those errors. If an input is received to continue with the preparation, the process 1200 proceeds to 1230.

The process 1200 accesses (at 1230) the content distribution account that is associated with the user. In accessing the account, the process 1200 might receive input of username and password from the user. The process 1200 then determines (at 1235) whether to add version information for the book. If the book is a new book, the process 1200 proceeds to 1245, which is described below. If the book is an update, the process specifies (at 1240) that the book is an update to a previously published book. In specifying the book as an update to a previously published book, the process 1200 might receive identification of the previously published book. The process 1200 may also receive an input of a new version number.

At 1245, the process 1200 determines whether to generate a sample book. If an input is received to manually create the sample book, the process 1200 proceeds to 1255, which is described below. If an input is received to generate the sample book, the process 1200 generates (at 1250) the sample book from the full-length book that is being prepared for publication. The sample book may include a selection of pages from a chapter selected by the user. An example process for generating a sample book will be described in detail below by reference to FIG. 23.

As shown in FIG. 12, the process 1200 creates (at 1255) a package bundle to deliver to the content distribution system. In some embodiments, the package bundle includes the book and the sample book. The package bundle may also include other items, such as book metadata, cover art, media content, etc.

Some embodiments perform variations on the process 1200. The specific operations of these processes 1200 may not be performed in the exact order shown and described. The specific operations may not be performed in one continuous series of operations, and different specific operations may be performed in different embodiments. For instance, the process 1200 might not allow a user to specify that the book is an update to a previous published book. Also, the process 1200 might not generate the sample book and/or access the user account information. Furthermore, the process 1200 could be implemented using several sub-processes, or as part of a larger macro process.

2. Error Analysis Process

As mentioned above, the content authoring application of some embodiments performs a pre-publish check to discover errors in a document. In some embodiments, the pre-publish check entails identifying blocking errors and non-blocking errors. The blocking errors are those that can prevent the document from being published. For example, the content distribution system may place a limit on the file size of the document, and the analysis may entail identifying whether the document exceeds the size limit. Different from blocking errors, non-blocking errors are those that may be noticeable in the published document but do not need to be corrected prior to publication.

Figure 13:
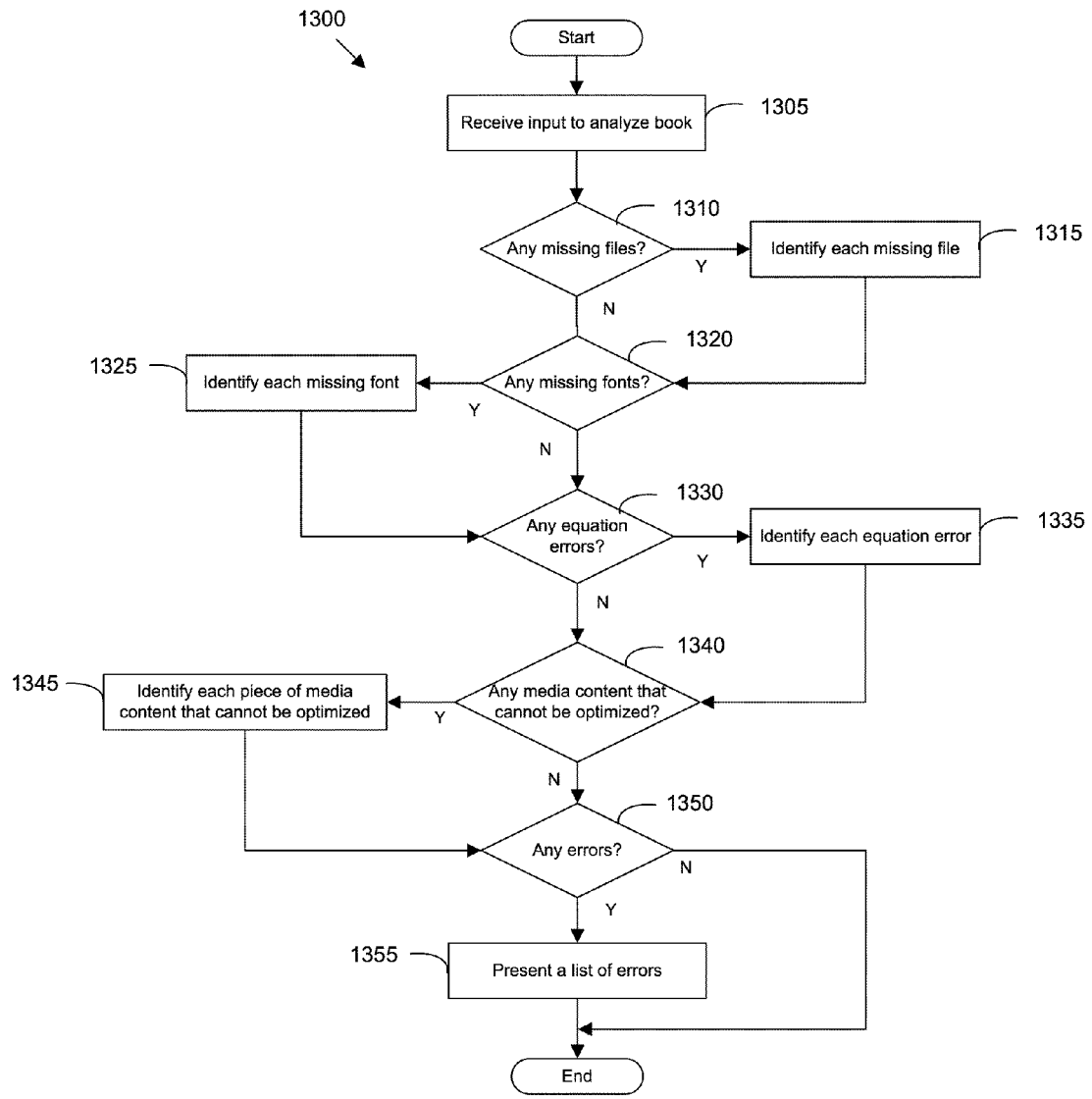
FIG. 13 conceptually illustrates a process performed by some embodiments to analyze a document to identify errors.

FIG. 13 conceptually illustrates a process 1300 performed by some embodiments to analyze a book to identify errors. The process 1300 in some embodiments is performed by the content authoring application. The process 1300 begins when it receives (at 1305) input to analyze the book. For example, the process 1300 may be directed to perform the pre-publish analysis in response to a user input to publish the book.

At 1310, the process 1300 determines whether there are any missing files. If there are no missing files, the process 1300 proceeds to 1320, which is described below. However, if there are missing files, the process identifies (at 1315) each missing file. For example, the book might refer to an image, an audio clip, or a video clip that cannot be found on the storage system.

The process 1300 determines (at 1320) whether there are any missing fonts. If there are no missing fonts, the process 1300 proceeds to 1330, which is described below. However, if there are missing fonts, the process identifies (at 1325) each missing font. The missing font error can happen when a font is deleted from a computing device or when a book page is edited on two different computing devices with different fonts. In some embodiments, the process 1300 might present a prompt that requires the user to verify the licenses of several fonts. For example, the book may contain fonts that do not come pre-installed on a tablet's OS. The prompt may list the fonts that are in question, and may state that the user should make sure that the licenses for the fonts give user the permission to distribute the electronic book with these fonts. Furthermore, the prompt may ask that the user consult with the license agreements for the fonts or contact the fonts creator in order to validate the user's permissions.

As shown in FIG. 13, the process 1300 determines (at 1330) whether there are any equation errors. Here, the process of some embodiments analyzes the book to identify improperly formatted equations and/or empty equations. For instance, the book might be missing an equation where there should be one, or the book might have an equation that is not written correctly (e.g., a mathematic symbol is in the wrong place, a wrong symbol is used, etc.). If there are no equation errors, the process 1300 proceeds to 1340, which is described below. However, if there are equation errors, the process identifies (at 1335) each equation error.

At 1340, the process 1300 determines whether there is any media content that cannot be optimized. If not, the process 1300 proceeds to 1350, which is described below. However, if there is media content that cannot be optimized, the process identifies (at 1345) each piece of such media content. In some embodiments, the process identifies each piece of media (e.g., image, audio clip, video clip) that is over a particular size and/or the media whose format is not a supported format.

The process 1300 determines (at 1350) whether any errors have been found based on the analysis of the book. If so, the process 1300 presents (at 1355) a list of errors. Several examples of displaying different errors are described above by reference to FIGS. 6 and 7. The process 1300 then ends.

Some embodiments perform variations on the process 1300. The specific operations of these processes 1300 may not be performed in the exact order shown and described. The specific operations may not be performed in one continuous series of operations, and different specific operations may be performed in different embodiments. For instance, the order of the analysis is arbitrary as the process might check one type of error before the other. In addition, the process 1300 might run multiple threads to analyze the book for different types of errors. Furthermore, the process 1300 could be implemented using several sub-processes, or as part of a larger macro process.

3. Adding Version Information Process

Figure 14:
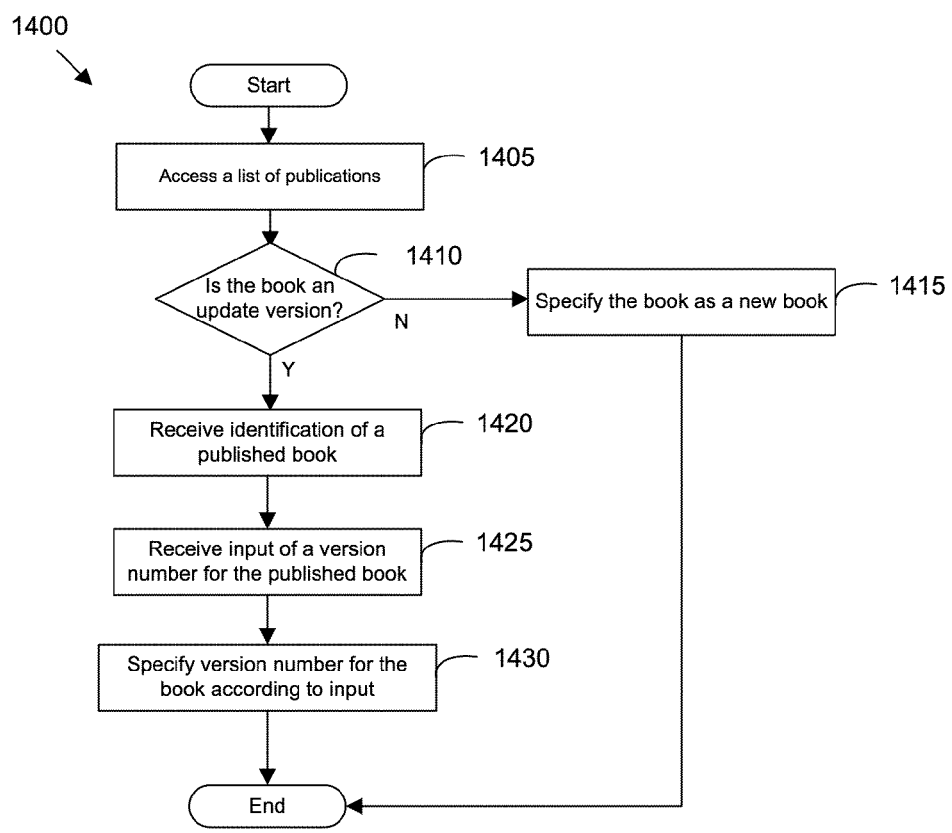
FIG. 14 conceptually illustrates a process performed by some embodiments to specify a version number for a document.

The content publishing tool of some embodiments allows a user to specify that a book is a new book or an update to a previously published book. FIG. 14 conceptually illustrates a process 1400 performed by some embodiments to specify a version number for a book. The process 1400 in some embodiments is performed by the content authoring application.

As shown in FIG. 14, the process 1400 begins when it accesses (at 1405) a list of publications in a book publishing account. To access the account, the process 1400 might first receive account's username and password from the user. An example of such a sign in operation is described above by reference to FIG. 8.

Next, the process 1400 determines (at 1410) whether the current book is an update to a previously published book. If it is not, the process 1400 specifies (at 1415) the book as a new book and ends. In some embodiments, the process 1400 automatically specifies the book as a new book when the account has no publication history. For example, if the user has not published any book, the process 1400 might by default specify the book as a new book.

If the book is an update to a previously published book, the process 1400 receives (at 1420) identification of a published book for the book. The process 1400 then receives (at 1425) input of a version number for the book. The process 1400 then specifies (at 1430) a version number for the book according to the inputs received at 1425. The process 1400 then ends. Some embodiments perform variations on the process 1400. The specific operations of the process 1400 may not be performed in the exact order shown and described. The specific operations may not be performed in one continuous series of operations, and different specific operations may be performed in different embodiments. Furthermore, the process 1400 could be implemented using several sub-processes, or as part of a larger macro process.

III. Version Update

In several of the example described above, the content authoring application allows its user to specify that a document is an update to a previously published document. The content distribution system of some embodiments implements a publishing model that provides documents as an evolving piece of work that change over time. For example, when a document is updated, an end-user (e.g., customer) may be notified through the content distribution system that there is an update to the document. The user can then user his or her device to download the update. Several examples of updating a document will now be described by reference to FIGS. 15-17.

Figure 15:
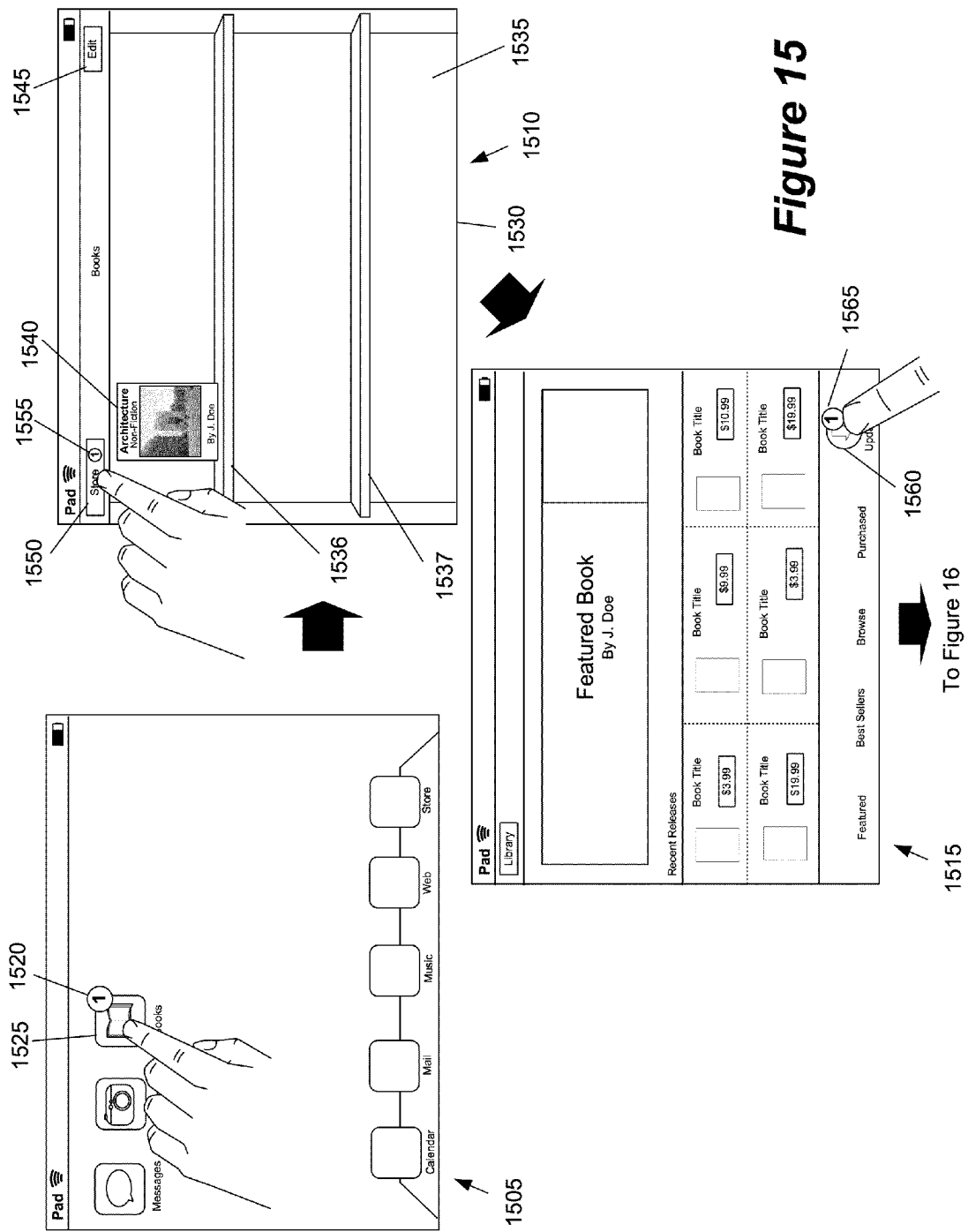
FIG. 15 provides several example notifications that are shown on an end user's device when there is a new version of a published document.

FIG. 15 provides several example notifications that are shown on an end user's device when there is a new version of a published book. Three operational stages 1505-1515 of the end user's tablet are shown in this figure. The first stage 1505 illustrates the end-user receiving a notification about an update to a book. Specifically, the notification is received through a digital content viewing application that displays a marking on the device at the operating system level. In this example, the marking is a badge 1520 on the icon 1525 of the digital content viewing application. The badge 1520 includes a number that identifies the number of books with an update. For example, the number "1" on the badge 1520 provides a visual indication to the end-user that there is one new book update available.

In the first stage 1505, the user selects the icon 1525. As shown in the second stage 1510, the selection causes the content viewing application to display its GUI 1530. The GUI 1530 includes a virtual bookshelf 1535 with two shelves 1536 and 1537 for displaying different representations of digital books. Here, a previously purchased book 1540 is shown as sitting on the top shelf 1536 with its cover facing forward. Several selectable items (e.g., 1545 and 1550) are arranged along the top of the bookshelf 1535. These items include an edit button 1545 for deleting books or moving the books to another bookshelf, and a store button 1550 for opening the digital bookstore.

The second stage 1510 illustrates that the end-user is notified of the update at the application level. Specifically, the store button 1550 is displayed with a marking 1555. Similar to marking on the icon, the content viewing application has badged the store button 1550 with a number that identifies the number of books with an update. As shown in the second stage 1510, the end-user selects the store button 1510.

The third stage 1515 illustrates that the end-user is notified of the update at the menu level. In particular, the update button 1560 is displayed with a badge 1565 that contains the same number. As mentioned above, this number identifies the number of books with an update. To proceed with the update, the end-user selects the update button 1560.

Figure 16:
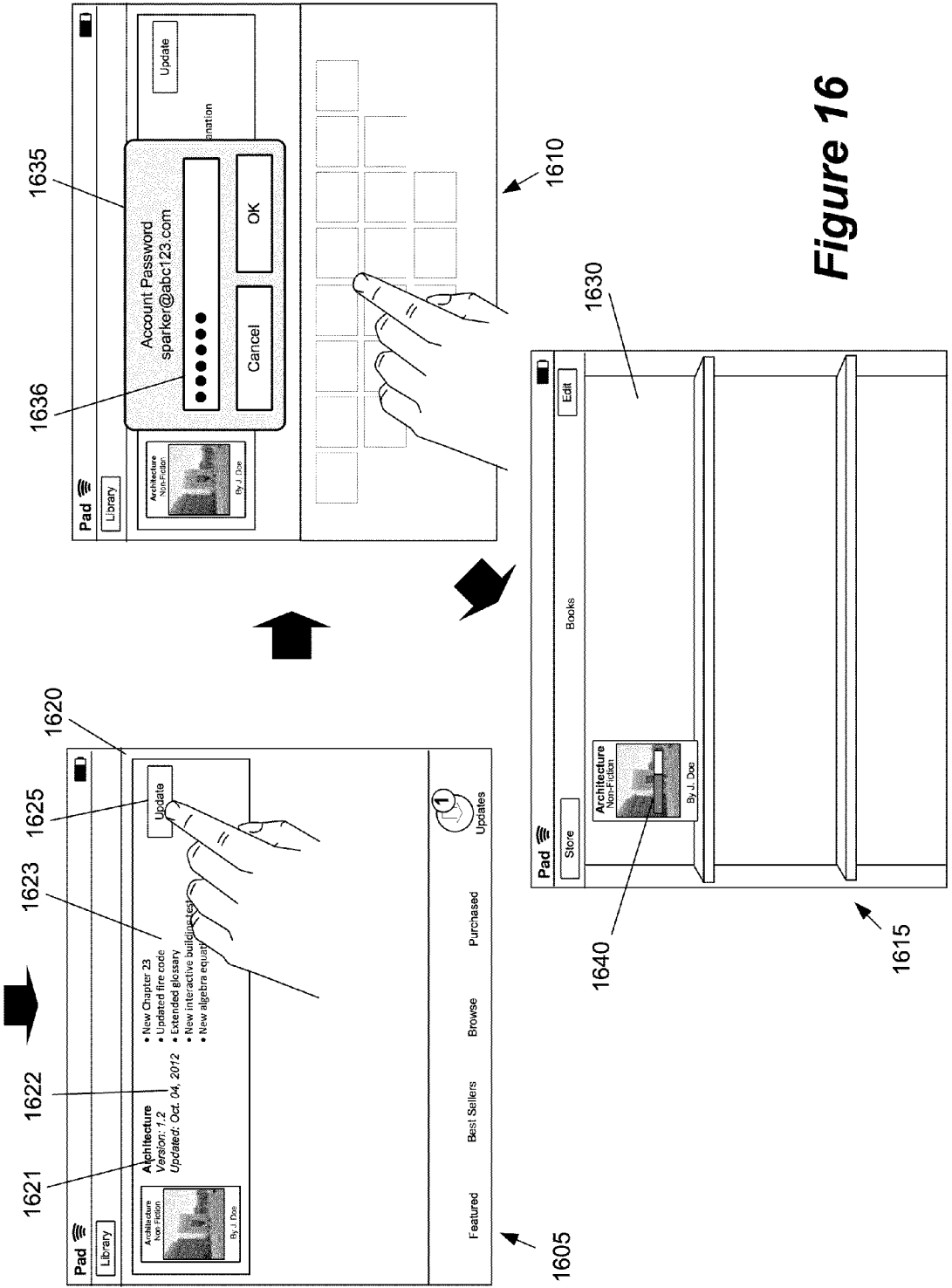
FIG. 16 provides an illustrative example of updating a document to a new version.

FIG. 16 provides an illustrative example of updating a book to a new version. Three operational stages 1605-1615 of the end user's device are illustrated in this figure. These operations are continuations of the ones illustrated in the previous figure. The first stage 1605 illustrates the content viewing application after the user has selected the update button in the previous figure. As shown, the application displays an update menu 1620. In some embodiments, the update menu 1620 lists each full-length book that the user obtained (e.g., purchased and downloaded) and that has been updated.

In the first stage 1605, the update menu 1620 lists one book. The book is listed in the menu with the current version number 1621 and the book's update date 1622. The book is also listed with information 1623 that identifies the changes from the previous version. Here, the information 1623 states that the book has been updated with a new chapter and an extended glossary. In addition, the menu 1620 includes an update button 1625 for downloading the latest version of the book.

The second stage 1610 shows the content viewing application after the selection of the update button 1625. As shown, the application displays a pop-up window 1635 to access the user's content store account. The pop-up window 1635 includes a text input field 1636 for inputting password, an "OK" button for confirming the inputted password, and a "Cancel" button for closing the pop-up window.

In the third stage 1615, the content viewing application displays the bookshelf view 1630 after accessing the user's store account and receiving authorization to update the book. As shown, the selection of the "OK" button from the pop-up window 1635 (or the update button 1625 if the user has previously signed in to the user account) results in the application downloading an update to the book. The progress bar 1640 is shown over the book's thumbnail representation. This bar provides a visual indication to the end-user of the amount of data has been downloaded and of the remaining data that need to be downloaded in order to update the book to the new version. When the updated version is downloaded, the user can then select the book's thumbnail representation (e.g., from the virtual bookshelf) to open the book and review its contents. In some embodiment, the new version of a document replaces the old version of the same document. However, the content viewing application might retain the old version or provide an option to retain it, so that the application's user can choose which version to view.

In the previous example, the content viewing application provides several notifications informing the end-user of an update to a book. In some embodiments, the content viewing application provides a notification regarding an available document update upon selection of the document's representation. This notification may be a one-time notification. That is, the notification may be displayed only once with each update.

Figure 17:
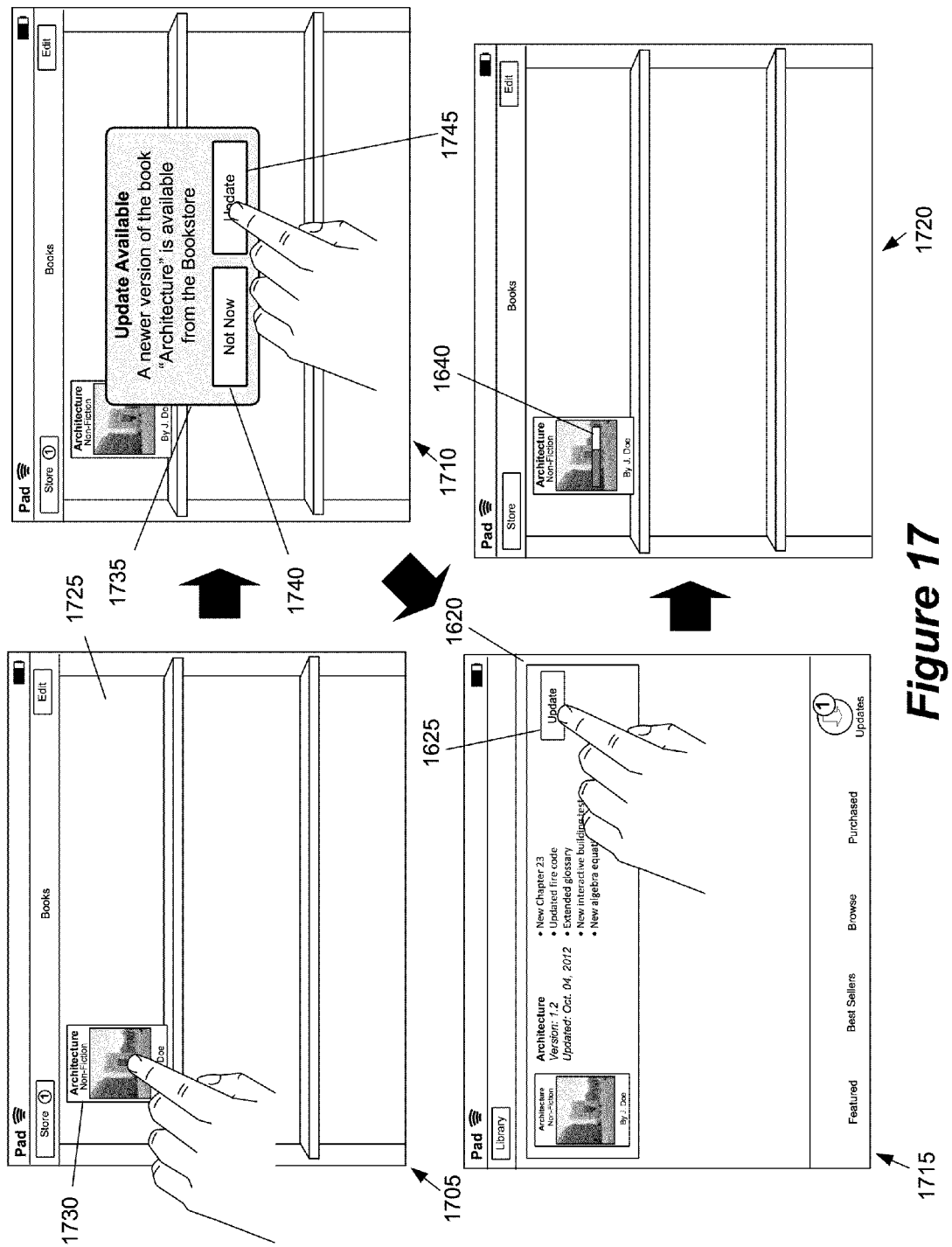
FIG. 17 provides an illustrative example of displaying a notification upon selection of a document.

FIG. 17 provides an illustrative example of displaying a notification upon selection of a representation of a book. Four operational stages 1705-1720 of the end-user's device are illustrated in this figure. In the first stage 1705, the content viewing application has been opened. The bookshelf 1725 displays a representation for each book. Here, the user selects the representation 1730 of a book. As shown in the second stage 1710, the selection causes the application to display a pop-up window 1735. The window 1735 includes a message and several buttons. The message states that an update of the selected book is available. Specifically, the message states that a newer version of the book is available from the bookstore. The book is identified by its name in this window. The window 1735 also includes a "Not Now" button 1740 to not update the book at this moment, and an "Update" button 1745 to proceed with the update.

In the second stage 1710, the end-user selects the update button 1745. The selection causes the application to display the update menu 1620, as illustrated in the third stage 1715. The user then selects the update button 1625 to update the book to the newer version. As shown in the fourth stage 1720, the selection of the update button 1625 results in the application downloading an update to the book. The progress bar 1640 is shown over the book's thumbnail representation. This bar provides a visual indication to the end-user of the amount of data that needs to be downloaded to update the book to the new version.

Having described several example update notifications, an example process for presenting such notifications will now be described by reference to FIG. 18. This figure conceptually illustrates a process 1800 performed by some embodiments to present update notification regarding a document. In some embodiments, the process 1800 is performed by the content viewing application.

Figure 18:
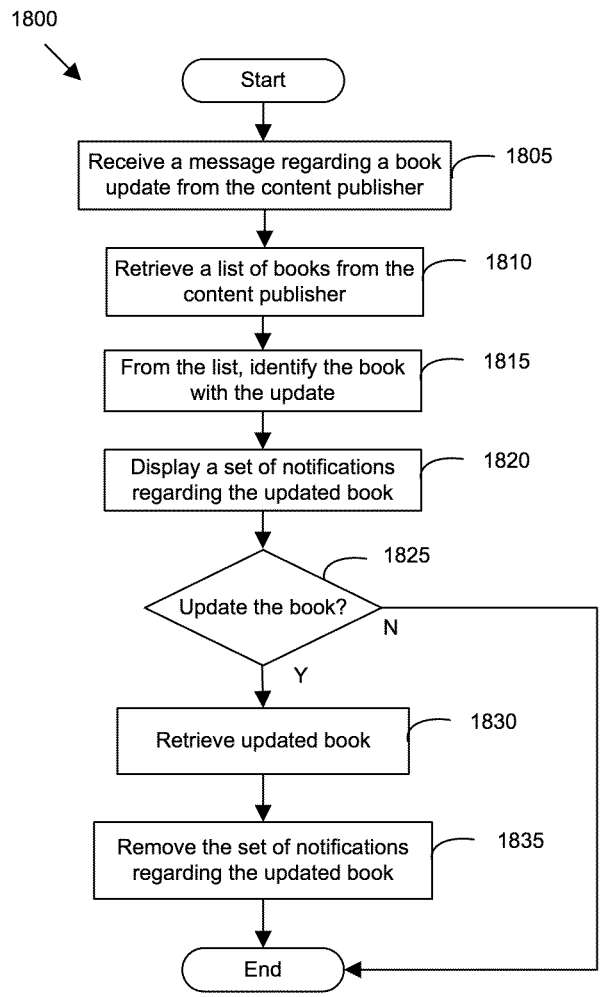
FIG. 18 conceptually illustrates a process performed by some embodiments to update a document on a device.

As shown in FIG. 18, the process 1800 begins by receiving (at 1805) a message regarding a book update from the book publisher. The process 1800 then retrieves (at 1810) a list of books from the content distribution system (e.g., the book publisher). From the retrieved list, the process 1800 identifies (at 1815) the book with the update. Next, the process 1800 displays (at 1820) a set of notifications regarding the updated book. Several different example notifications are described above. For instance, the process 1800 might mark an icon with a marking (e.g., a badge) at the operating system level. Alternatively, or conjunctively with the icon, the process 1800 may mark a user interface item (e.g., a store button) at the application level, and/or a menu item (e.g., an update menu button) at the menu level. The process 1800 might also provide a notification (e.g., in a pop-up window) when the book is selected, as shown in FIG. 17.

At 1825, the process 1800 determines whether to update the book. For example, the process 1800 might receive a user input to download the update from the content distribution system. When such an input is received, the process 1800 retrieves (at 1830) the updated book from the content distribution system (e.g., the book publisher). Next, the process 1800 removes (at 1835) the set of notifications regarding the updated book. The process 1800 then terminates.

Some embodiments perform variations on the process 1800. The specific operations of these processes 1800 may not be performed in the exact order shown and described. The specific operations may not be performed in one continuous series of operations, and different specific operations may be performed in different embodiments. Furthermore, the process 1800 could be implemented using several sub-processes, or as part of a larger macro process.

IV. Creating Samples

The content authoring application of some embodiments provides a document-sampling tool for generating a sample document. This tool allows a user to identify a section of a document (e.g., a chapter of a book) and generate a sample document that includes a selection of pages from that section. Different heuristics can be used to generate the sample document using the pages from the section. For example, the sample document may be generated using a predefined percentage (e.g., 20%) of the pages of the section up to a maximum of a predefined number of pages (e.g., 20 pages). The heuristics of the sample generation may also specify that the sample document include a minimum of some number of pages (e.g., three pages).

In some embodiments, the sample book includes one or more other items, such as an introductory media and a glossary. The introductory media is an introductory image that is shown or an introductory video or audio clip that is played when the book is opened. The glossary includes definitions to different terms used in the book, links to related glossary terms, and/or an index to where the terms appear in the book. An example of creating a sample book will now be described by reference to FIGS. 19 and 20.

Figure 19:
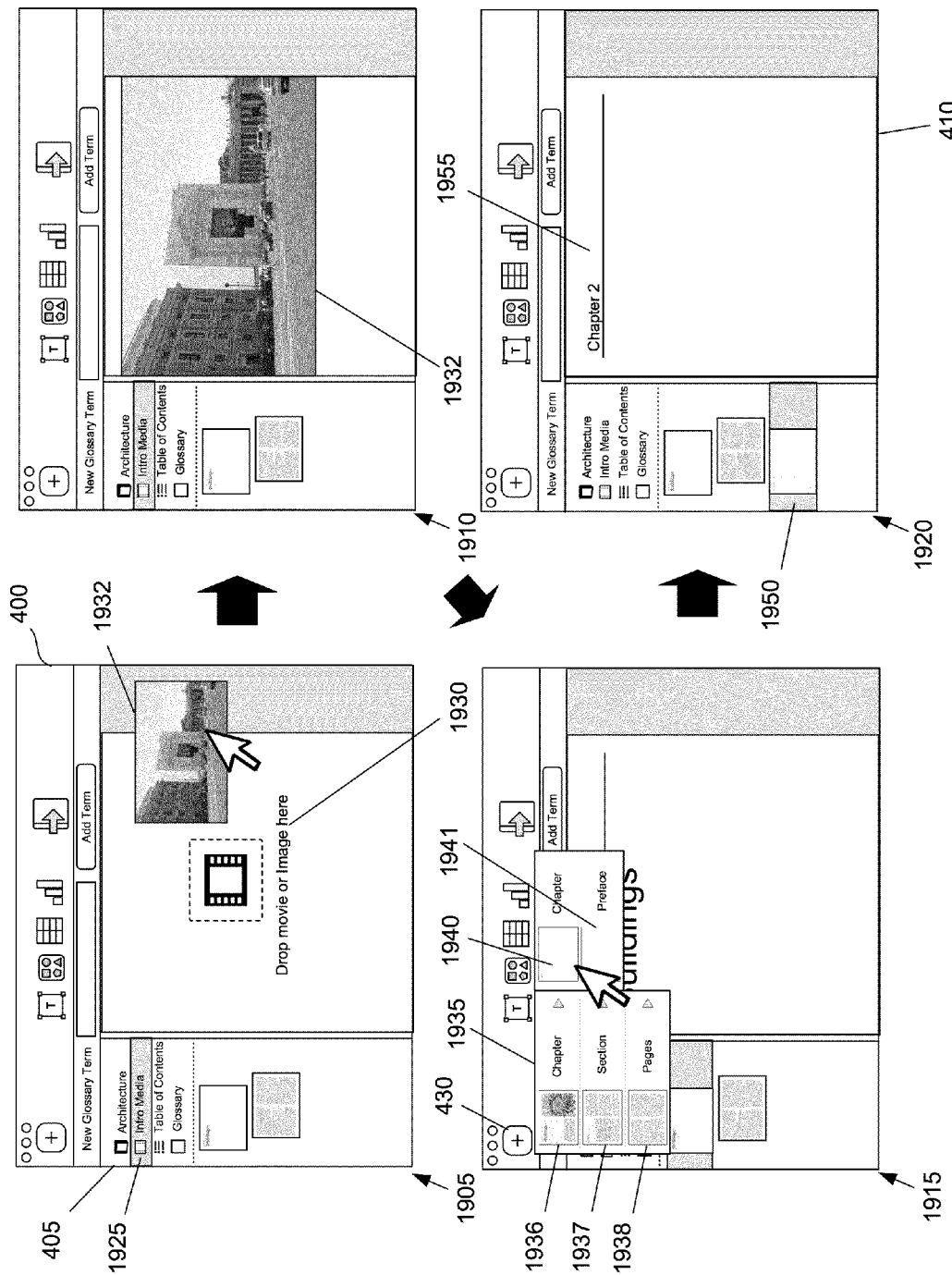
FIG. 19 provides an illustrative example of editing a document.

In some embodiments, the content authoring application provides editing tools to author a book that contains an introductory media and a glossary. FIG. 19 provides an illustrative example of editing a book. Specifically, this figure illustrates in four operational stages 1905-1920 how the content authoring and publishing application can be used to add an introductory media and a new chapter to the book. As shown, the figure includes the application's GUI 400 that is the same as the one describe above by reference to FIG. 4.

In the first stage 1905, the GUI 400 displays the book that the user is authoring with the application. The thumbnail display area 405 displays thumbnail representations of the book pages. Here, the thumbnail representation 1925 of the introductory media page has been selected from the thumbnail display area 405. As such, the book authoring application displays a page for adding an introductory media. The page includes a note 1930. The note 1930 states that the user can add an introductory media to the book by dragging and dropping a video clip or an image onto the page.

The second stage 1910 illustrates the GUI 400 after adding a video clip 1932 to the introductory media page. Specifically, the GUI 400 shows a frame of the video clip 1932 that has been added as the introductory media for the book. In this example, the video clip 1932 is now an introductory video that will be played when the book is opened. For example, when a customer purchases the published book and opens it, the video clip 1932 will automatically be played prior to displaying the first page.

The third stage 1915 illustrates an example of adding a new chapter to the book. Specifically, the user select the add page button 430. The selection causes the application to displays a drop-down list 1935 that includes different types of pages that can be added to the book. In this example, the drop-down list 1935 includes a chapter menu 1936, a section menu 1937, and a pages menu 1938. When the chapter menu 1936 is selected, the drop-down list 1935 reveals an item 1940 for creating a new chapter and an item 1941 for creating a preface.

In the third stage 1915, the user selects the item 1940 to create a new chapter. The fourth stage 1920 illustrates the GUI 400 after the user has selected the item 1940. As shown, the selection results in a new chapter being added to the book. This is shown in the thumbnail display area 405 that shows a representation of the new chapter page 1950. As the thumbnail representation 1950 is selected from the thumbnail display area 405, the page display area 410 displays the new chapter page 1955.

Figure 20:
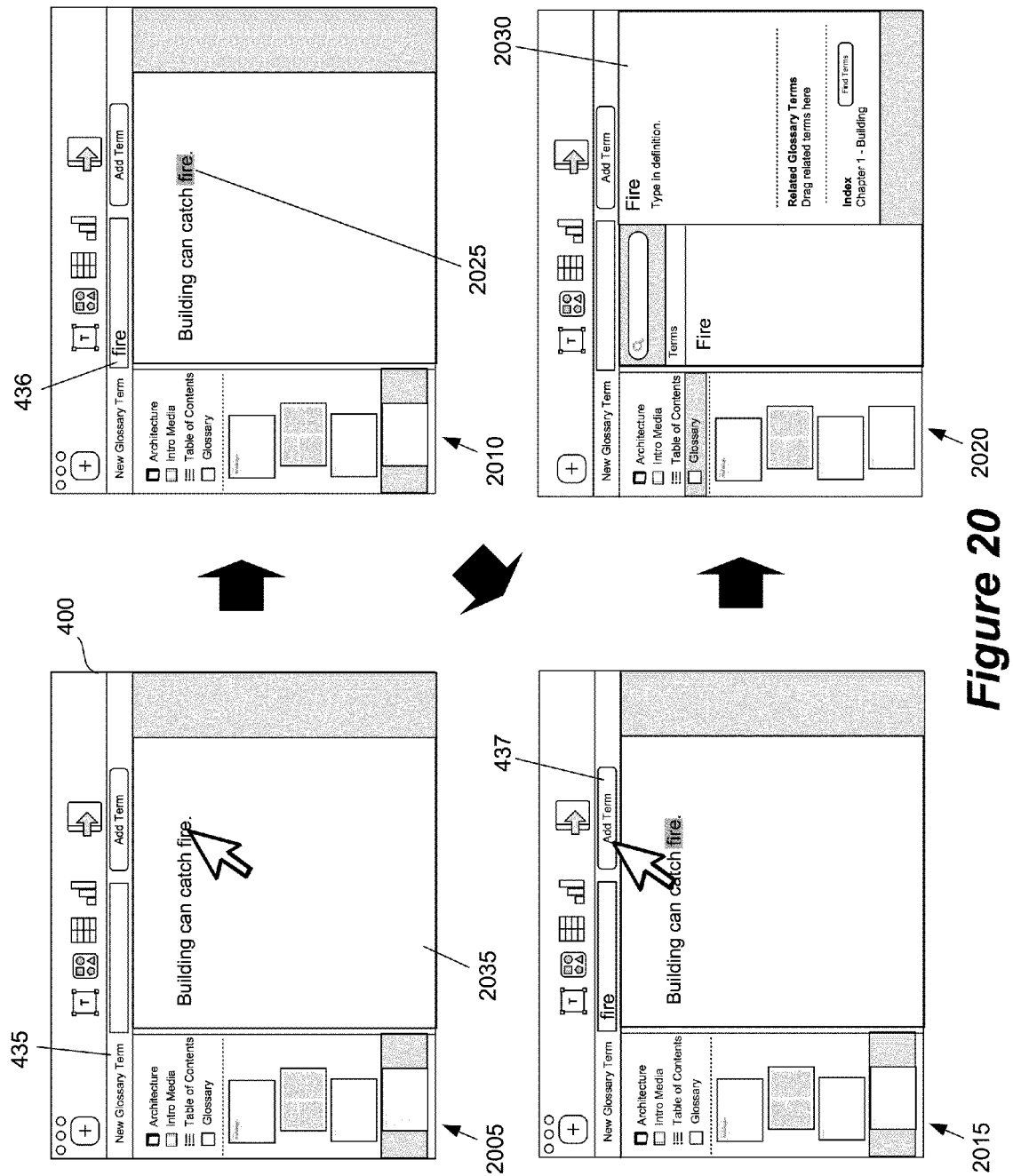
FIG. 20 provides an illustrative example of adding a term to a glossary of the document.

FIG. 20 provides an illustrative example of adding a term to a glossary of the book. Four operational stages 2005-2020 of the GUI 400 are shown in this figure. These operations are continuations of the ones shown in the previous figure. The GUI 400 includes the glossary tool 435 as described above by reference to FIG. 4. In the first stage 2005, the user has edited a page 2035 of the book. In the second stage 2010, a term 2025 has been selected from the page of the book. The selection causes the text field 436 to be populated with the term 2025. Alternatively, the user can type in the term 2025 into the text field 436. As shown in the third stage 2015, the user selects the add button 437 to add the term to the glossary.

The fourth stage 2020 illustrates the GUI 400 after the selection of the add button 437 of the glossary tool 435. The selection results in the display of a page 2030 of the glossary. As mentioned above, the glossary of some embodiments includes definitions to different terms used in the book, links to related glossary terms, and/or an index to where the terms appear in the book. Accordingly, each glossary term may be associated with a particular page where that term appears in the book. Each term in the glossary is a selectable item that when selected causes the digital book to display the page that includes that term.

Figure 21:
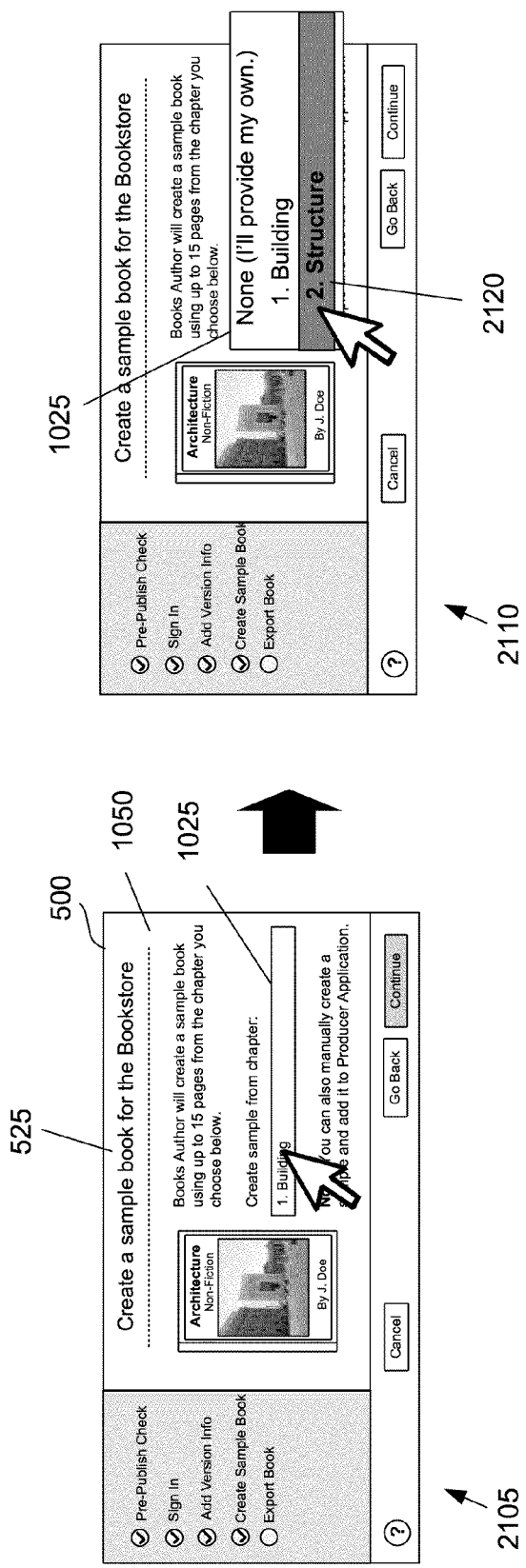
FIG. 21 provides an illustrative example of creating a sample document from a full-length document that a user has written with the application.

FIG. 21 provides an illustrative example of creating a sample book from the full-length book that the user has written with the application. Two operational stages 2105 and 2110 of the content authoring and publishing application are shown in this figure. These operations occur after the one shown in the previous FIGS. 19 and 20.

As shown in first stage 2105, the application displays the publishing tool 500. The user might have first selected the publish button to display this tool. Also, the application has guided the user through several other operations in preparing the book for publication. In the example illustrated in FIG. 21, these operations included performing a pre-publish check, signing in to the content distribution account, and version information.

In the first stage 2105, the publishing tool 500 displays a sheet 1050 for creating a sample book. The sheet 1050 includes a heading 525 that identifies the current step as creating a sample book for the bookstore. The body of the sheet 1050 states that the application will create a sample book using up to a predefined number of pages (e.g., 15 pages) from a chapter of the book that is chosen by the user. The sheet 1050 also includes a drop-down list 1025. When selected, the drop-down list 1025 displays different chapters from the book. The user can select any one of the chapters to create the sample book.

As shown in the first stage 2105, the application has selected by default the first chapter as one that would be used to create the sample book. That is, the application has analyzed the book to skip over one or more other sections (e.g., the table of contents, preface, about section, etc.), to find the first real chapter of the book, and to present it as the default selection in the drop-down list 1025. The chapter is listed with its actual chapter title in the drop-down list 1025. In the second stage 2110, the user selects the option 2120 to create the sample book from the second chapter.

Figure 22:
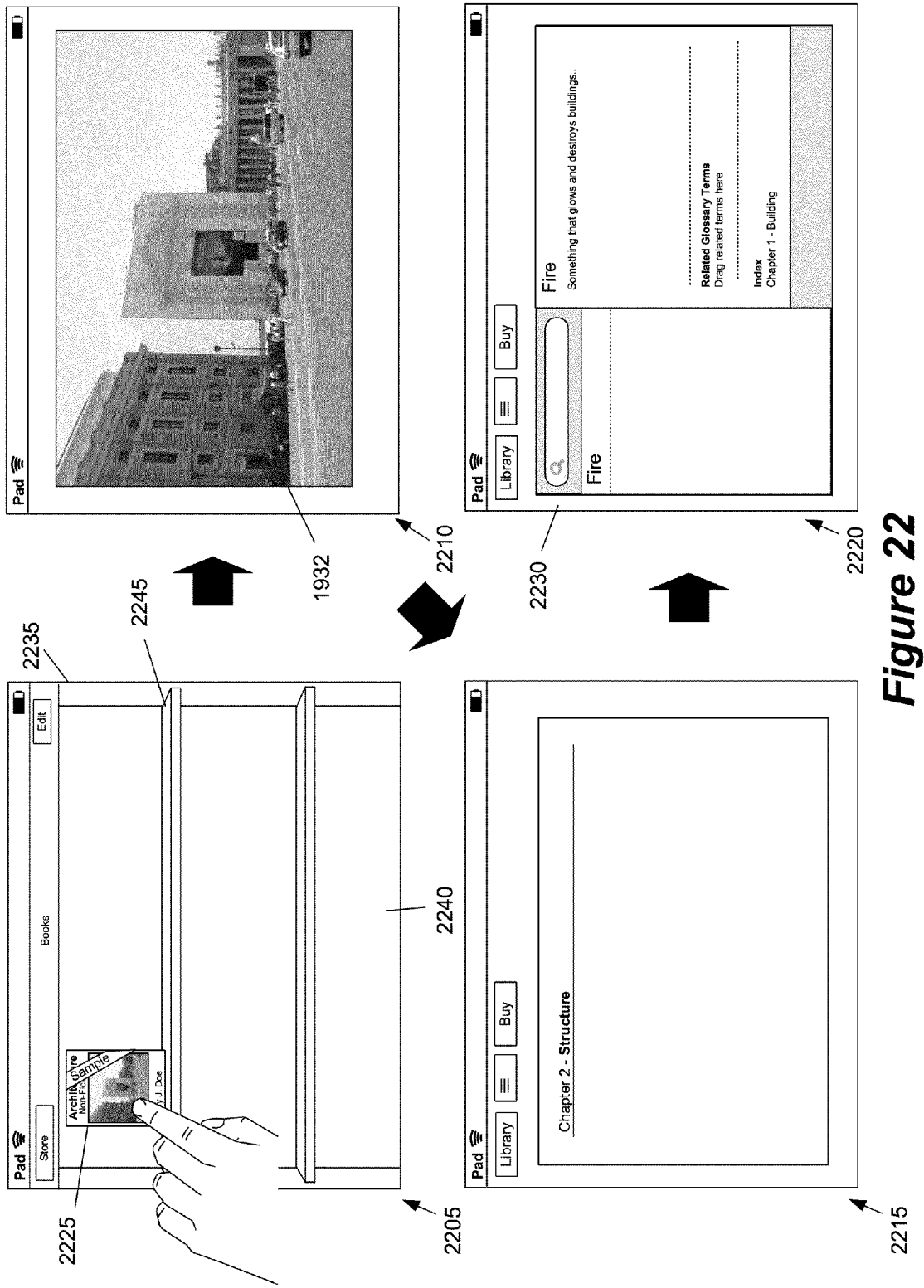
FIG. 22 provides an illustrative example of a sample document appearing on an end user's device.

FIG. 22 provides an illustrative example of the sample book appearing on an end-user's device. Four operational stages 2205-2220 of the end user's device are illustrated in this figure. These operations occur after the sample book has been published and downloaded on the end user's device.

In the first stage 2205, the content viewing application has been opened to display a GUI 2235. A thumbnail representation 2225 of the book is shown on a shelf 2245 of the virtual bookshelf 2240. As shown, the user selects the thumbnail representation 2225 to open the sample book. The second stage 2210 illustrates the content viewing application after the book has been opened. The book opened to a video clip 1932. This is the same video clip that was added to the full-length book in the example of FIG. 19.

The third stage 2215 illustrates the content viewing application displaying a first page of the second chapter of the book. This is the same chapter that was selected in the example described above by reference to FIG. 21. The fourth stages 2220 illustrates the content viewing application displaying the glossary 2230 of the sample book. The glossary 2230 includes only one term added with the content authoring application, as described above by reference to FIG. 20.

Figure 23:
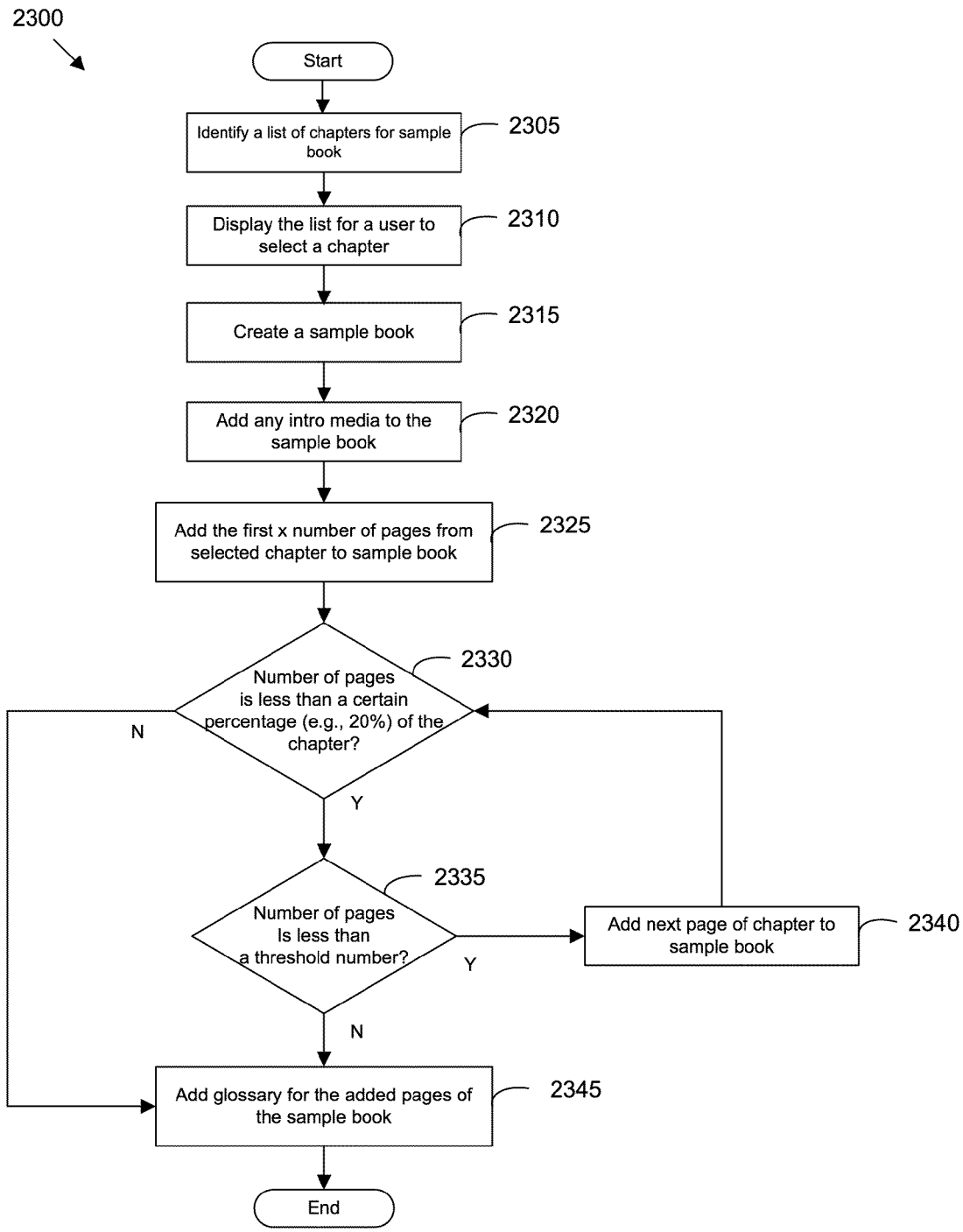
FIG. 23 conceptually illustrates a process performed by some embodiments to create a sample document for a published document.

Having described an example of creating a sample books, an example process for creating a sample book will now be described. FIG. 23 conceptually illustrates a process 2300 performed by some embodiments to create a sample book from a full-length book. In some embodiments, the process is performed by the content publishing application. The process 2300 begins when it identifies (at 2305) a list of chapters from the book for creating the sample book. For example, the process might analyze pages of the book to skip over one or more sections (e.g., the table of contents, preface, about section, etc.) to identify the chapters.

Next, the process 2300 displays (at 2310) the list of chapters. Specifically, the process 2300 displays this list for a user to select a chapter from the full-length book. The process 2300 then creates (at 2315) the sample book. The process 2300 then adds (at 2320) introductory media, if there is any, to the sample book. The process 2300 then adds (at 2325) the first x number of pages from the selected chapter to the sample book. For example, the process might attempt to add, at a minimum, the first x number (e.g., three) of pages to the sample book. This entails adding the entire chapter if the number x is equal to or greater than the number of pages in the chapter.

Next, the process 2300 determines (at 2330) whether the number of pages of the sample book is less than a certain percentage of the selected chapter. For example, the process might generate the sample book using twenty percent of the pages from the chapter of the full-length book. If the number of pages is not less than the percentage, the process 2300 proceeds to 2345, which is described below. If the number of pages is less than the percentage, the process 2300 determines (at 2335) whether the number of pages of the sample book is less than a threshold number. For example, the process might generate the sample book from up to a maximum of the first y number of pages (e.g., 20 pages or 15 pages) from the chapter.

If the number of pages is not less than the threshold number, the process 2300 proceeds to 2345. Otherwise, the process 2300 adds (at 2340) a next page of the chapter to the sample book. At 2345, the process 2300 adds a glossary for pages of the sample book. The process 2300 then terminates. Some embodiments perform variations on the process 2300. The specific operations of the process 2300 may not be performed in the exact order shown and described. The specific operations may not be performed in one continuous series of operations, and different specific operations may be performed in different embodiments. Furthermore, the process 2300 could be implemented using several sub-processes, or as part of a larger macro process.

V. Architecture

A. Example Software Architecture

Figure 24:
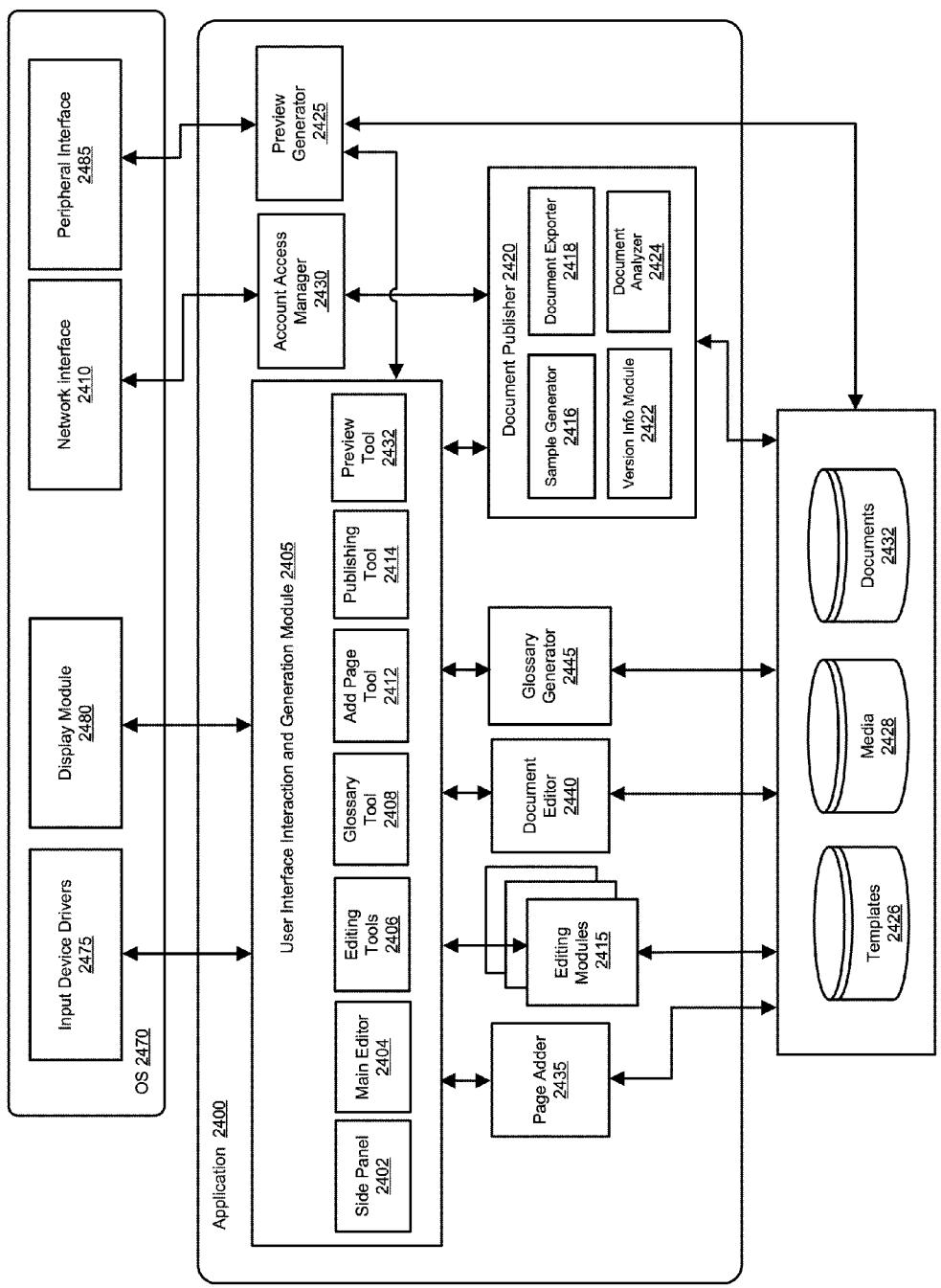
FIG. 24 conceptually illustrates the software architecture of a content authoring application of some embodiments.

In some embodiments, the processes described above are implemented as software running on a particular machine, such as a computer or a handheld device, or stored in a machine-readable medium. FIG. 24 conceptually illustrates the software architecture of a document authoring application 2400 of some embodiments. In some embodiments, the document authoring application is a stand-alone application or is integrated into another application, while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The application 2400 includes a user interface (UI) interaction and generation module 2405, an editing modules 2415, a document publisher 2420, a preview generator 2425, an account access manager 2430, a page adder 2435, a document editor 2440, and a glossary generator 2445. As shown, the user interface interaction and generation module 2405 generates a number of different UI elements, including a side panel 2402 (also referred to as a thumbnail display area), a main display area 2404 (also referred to as a page editor), a set of editing tools 2406, a glossary tool 2408, an add page tool 2412, a publishing tool 2414, and a preview tool 2432. Many of these user interface items are described in detail above by reference to FIG. 4.

The figure also illustrates stored data associated with the application, namely template data 2426 relating to pre-designed document templates, media data 2428 relating to different types of media content (e.g., video clip, audio clip, images, etc.), and document data 2432 relating to documents created with the application. In some embodiments, the templates data 2426 stores template files that define different types of documents a user can create with the document authoring application 2400. The media data 2428 stores various types of media files (e.g., still image files, video files, audio files, combined video and audio files, etc.) imported into the application. The documents data 2432 of some embodiments stores user-created documents that may incorporate or refer to media 2428 and templates 2426. In some embodiments, the documents 2432 are stored by the document authoring application as hierarchical structures (e.g., organized into chapters, sections, etc.).

In some embodiments, the three sets of data 2426, 2428, and 2432 are stored in one physical storage (e.g., an internal hard drive, external hard drive, etc.). In some embodiments, the data may be split between multiple physical storages. For instance, the template files 2426 and media files 2428 might be stored in one physical storage, while the user-created documents are stored in a separate physical storage. In addition, some or all of the data 2426, 2428, and 2432 may be stored across multiple physical storages in some embodiments.

FIG. 24 also illustrates an operating system 2470 that includes input device driver(s) 2475, display module 2480, peripheral interface 2485, and network interface 2410. In some embodiments, as illustrated, the device drivers 2475, display module 2480, peripheral interface 2485, and network interface 2410 are part of the operating system even when the document authoring application 2400 is an application separate from the operating system.

The input device drivers 2475 may include drivers for translating signals from a keyboard, mouse, touchpad, tablet, touchscreen, etc. A user interacts with one or more of these input devices, which send signals to their corresponding device driver. The device driver then translates the signals into user input data that is provided to the UI interaction and generation module 2405.

The input device drivers 2475 may include drivers for translating signals from a keyboard, mouse, touchpad, tablet, touchscreen, etc. A user interacts with one or more of these input devices, each of which send signals to its corresponding device driver. The device driver then translates the signals into user input data that is provided to the UI interaction and generation module 2405.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc.). For example, the present application illustrates the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The display module 2480 translates the output of a user interface for a display device. That is, the display module 2480 receives signals (e.g., from the UI interaction and generation module 2405) describing what should be displayed and translates these signals into pixel information that is sent to the display device. The display device may be an LCD, plasma screen, CRT monitor, touchscreen, etc.

The peripheral 2485, in some embodiments, allows for a peripheral device to connect (either via a wired (e.g., USB, Firewire) connection or a wireless (e.g., Bluetooth, Wi-Fi) connection) to the machine on which the operating system 2470 and document authoring application 2400 run. Examples of such peripheral devices may include smart phones (e.g., an iPhone), specialized electronic book readers, or more generic tablets (e.g., an iPad) that include electronic book reader functionality. The preview generator 2425 of some embodiments interfaces with an external device user the peripheral 2485 to provide a preview of a document. The preview may be based on user input (e.g., the user's selection of the external device) received through the preview tool 2432.

The network interface 2410 represents one or more connections to various types of networks, through which the document authoring application 2400 may upload published documents (e.g., to a content distribution system). These network connections may include Wi-Fi or other wireless connections, Ethernet or other wired connections, etc.

The UI interaction and generation module 2405 of the document authoring application 2400 interprets the user input data received from the input device drivers and passes it to various modules. The UI interaction and generation module

2405, in some embodiments, generates a number of different UI elements. These elements, in some embodiments, include the side panel 2402, the main display area 2404, the set of editing tools 2406, the glossary tool 2408, the add page tool 2412, the publishing tool 2414, and the preview tool 2432.

The UI interaction and generation module 2405 also manages the display of the document authoring application GUI, and outputs this display information to the display module 2480. This UI display information may be based on information from the document editor 2440, the document publisher 2420, etc. In addition, the module 2405 may generate portions of the UI based solely on user input—e.g., when a user moves an item in the UI that only affects the display rather than any of the other modules, such as moving a window from one side of the UI to the other. In some embodiments, the UI interaction and generation module 2405 generates a basic GUI and populates the GUI with information from the other modules and stored data (e.g., the document data 2432).

The preview generator 2425 of some embodiments generates a preview of an electronic document (e.g., an electronic book) in order to allow a user to see how a document currently being edited will look in its final form. In some embodiments, the preview generator 2425 generates the preview of the document and sends this preview through the peripheral interface 2485 to an external electronic document reader device (e.g., a smart phone, a table computer, a specialized e-book reader, etc.). In addition, in some embodiments the document authoring application 2400 allows the user to preview the document through the application's user interface. The preview generator of some such embodiments can send the preview to the UI interaction and generation module 2405 for display in the authoring application user interface.

The document editor 2440 in some embodiments includes a set of modules to format text, specify a document layout, change color of text, specify different fonts, etc. The editing modules 2415 enable a user to create documents (e.g., word processing documents, electronic books, etc.) with a variety of equations, media (e.g., audio, video), electronic book constructs (e.g., graphs, sidebars, popovers, etc.), and other features. Example editing operations include adding text boxes, shapes, tables, charts, media content, etc.

The account access manager 2430 communicates with the document publisher 2420 to sign-in to the content distribution account and retrieve account information. For example, the document publisher 2420 may communicate with the account access manager 2430 to retrieve the user's publication history. The document publisher 2420 may then use the publication history to assist the user in providing version information relating to a document.

The page adder 2435 interfaces with the add page tool 2412 to add pages to a document. The pages may follow a structured hierarchy, e.g., with a chapter, followed by a section, and then other pages of the chapter. Accordingly, the electronic document that is exported with this application may be referred to as a structured electronic document. The glossary generator 2445 generates an entry in the glossary based on user interaction with the glossary tool 2408. An example of adding a glossary entry is described above by reference to FIG. 20.

The document publisher 2420 of some embodiments generates a final version of an electronic document (e.g., an e-book in either a standardized or proprietary format) for sending out (e.g., via the network interface 2410) to a content distribution system. In some embodiments, the document publisher 2420 creates the electronic document and/or a sample version of the electronic document, and a separate application connects to the content distribution system in order to upload (publish) the document. Document publisher 2420 of some embodiments includes various components to prepare a document for publication. In the example illustrated in FIG. 24, the document publisher 2420 includes a sample generator 2416 to generate a sample document, a document exporter 2418 to export the document, a version information module 2422 to specify a version number for the document, and a document analyzer 2424 to analyze the document for errors.

While many of the features of document authoring application 2400 have been described as being performed by one module (e.g., the UI interaction and generation module 2405, the document publisher 2420, etc.), one of ordinary skill in the art will recognize that the functions described herein might be split up into multiple modules. Similarly, functions described as being performed by multiple different modules might be performed by a single module in some embodiments (e.g., the preview generator 2425 might actually be part of the document publisher 2420).

B. Example System Architecture

Figure 25:
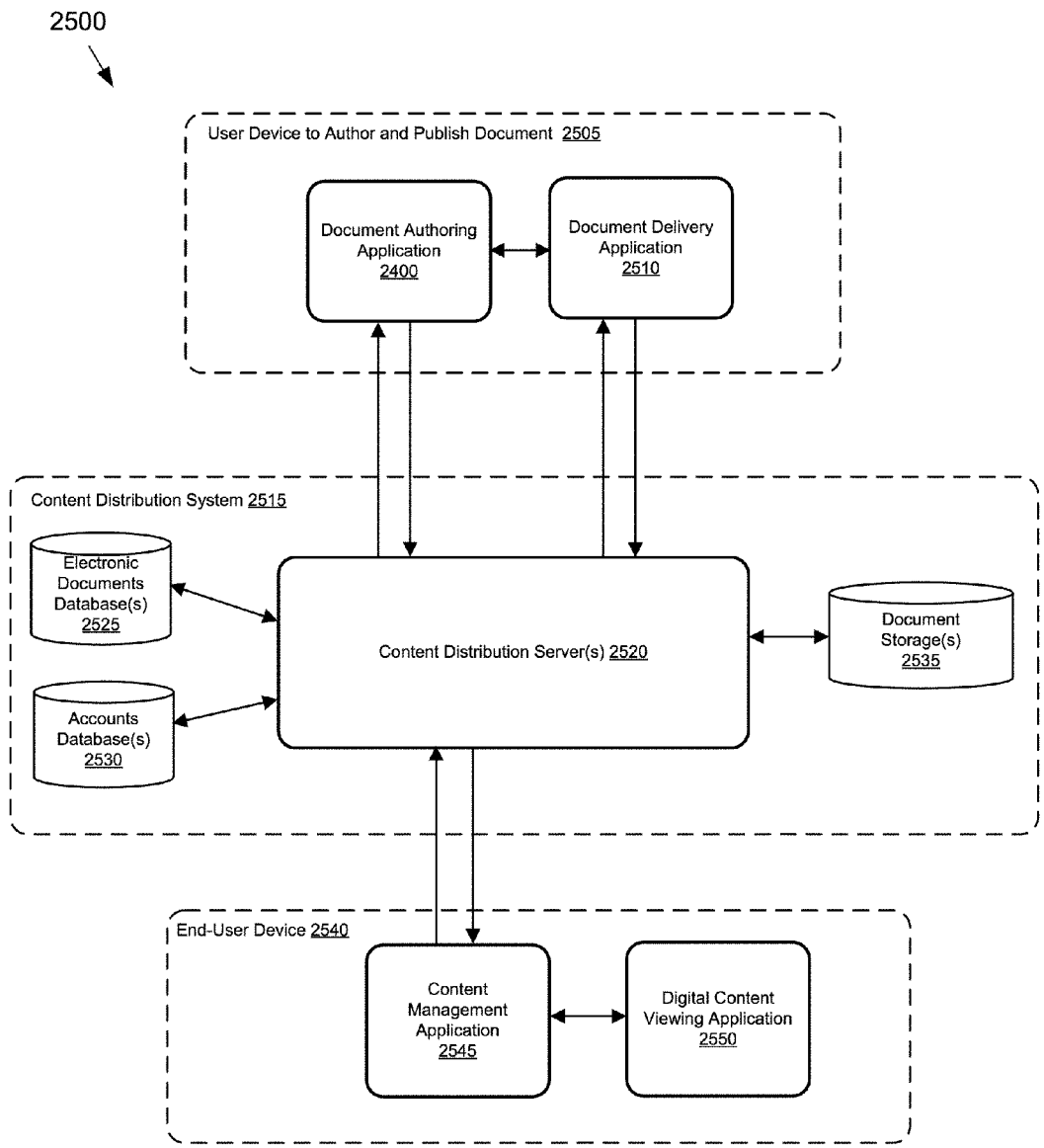
FIG. 25 illustrates an example system architecture for distributing documents.

FIG. 25 illustrates an example system architecture 2500 for distributing documents. The figure includes a user device 2505 to author and publish documents, an end-user device 2540 to view the published documents, and a content distribution system 2515 to distribute the documents. To simplify the description, only two devices 2505 and 2540 are shown in this figure. However, there can be multiple such devices in the system.

The user device 2505 is used to author and publish documents. The device executes several applications, namely the document authoring application 2400 and the document delivery application 2510, for authoring and publishing documents. The document authoring application 2400 is the same as the one described above by reference to FIG. 24. Different from the document authoring application, the document delivery application 2510 of some embodiments is used to input additional data regarding the publication and deliver the publication (e.g., the package bundle that includes the document, sample document, and other associated items) to the content distribution system 2515. An example of the document delivery application is described above by reference to FIG. 11. As mentioned above, the document generation and delivery features are provided in one single application in some embodiments.

The content distribution system 2515 facilitates the distribution of content to different user devices. In this example, the content distribution system 2515 receives the publication from the user device 2505 and distributes it to end-user devices (e.g., consumer electronic devices), such as the end-use device 2540 illustrated in FIG. 25. The content distribution system of some embodiments distributes a variety of different types of content. Examples of such types of content include electronic documents (e.g., books, newspapers, comic books, magazines, newsletters, etc.), music, movies, and television shows.

In distributing the content, the content distribution system 2515 may utilize a number of content distribution servers 2520. These servers may manage different control data associated with distributing content. For example, a content distribution server may access account information in an accounts database 2530. In some embodiments, the user account can be associated with not only a publishing account but also an account to download and/or purchase items from the content distribution system. As mentioned above, the content distribution system 2515 of some embodiments enables an entity (e.g., a person, a company, an organization) to create a paid distribution account and/or a free distribution account. The paid account allows the entity to sell documents and/or offer documents for free on the content distribution system's document store. The paid account might require the entity to provide banking and tax information in order for the entity to receive payment. Different from the paid account, a free distribution account only allows the entity to offer documents for free download in the document store.

As shown in FIG. 25, the content distribution servers 2520 maintain data related to electronic documents. Several examples of such data are described above by FIG. 11. The content distribution servers 2520 may also maintain version information (e.g., a document's version number, and the date of last update). In addition, the content distribution servers 2520 may store the assets (e.g., documents) in several different storages 2535. That is, the content distribution system 2515 may include several storage servers 2535 for storing the content to be distributed to the user devices.

The end-user device 2540 can be any number of different types of devices such as a tablet, a smart phone, a desktop computer, a laptop, etc. To download and present content on the device, the end-user device 2540 may include a content management application 2545 and a digital viewing application 2550. The content management application 2545 of some embodiments is used to manage the content on the end-user device. For example, the user can use this application to browse for content, purchase content, download content, update previously downloaded content, etc. On the other hand, the digital content viewing application 2550 is used to view content. In some embodiments, the content management application is provided as part of the content viewing application. For example, the user can use the content viewing application 2550 to purchase content, download content, and update content. Several examples of such an integrated application are described above by reference to FIG. 15-17.

One of ordinary skill in the art would understand that the system architecture 2500 is one example architecture and can be modifies in a number of different ways. For example, the content distribution system may communicate with third-party storage servers to store the vast amount of content that it distributes to different client devices. The content distribution system may include different servers to manage different types of data, such as account data and content data.

C. Example Data Structures

Figure 26:
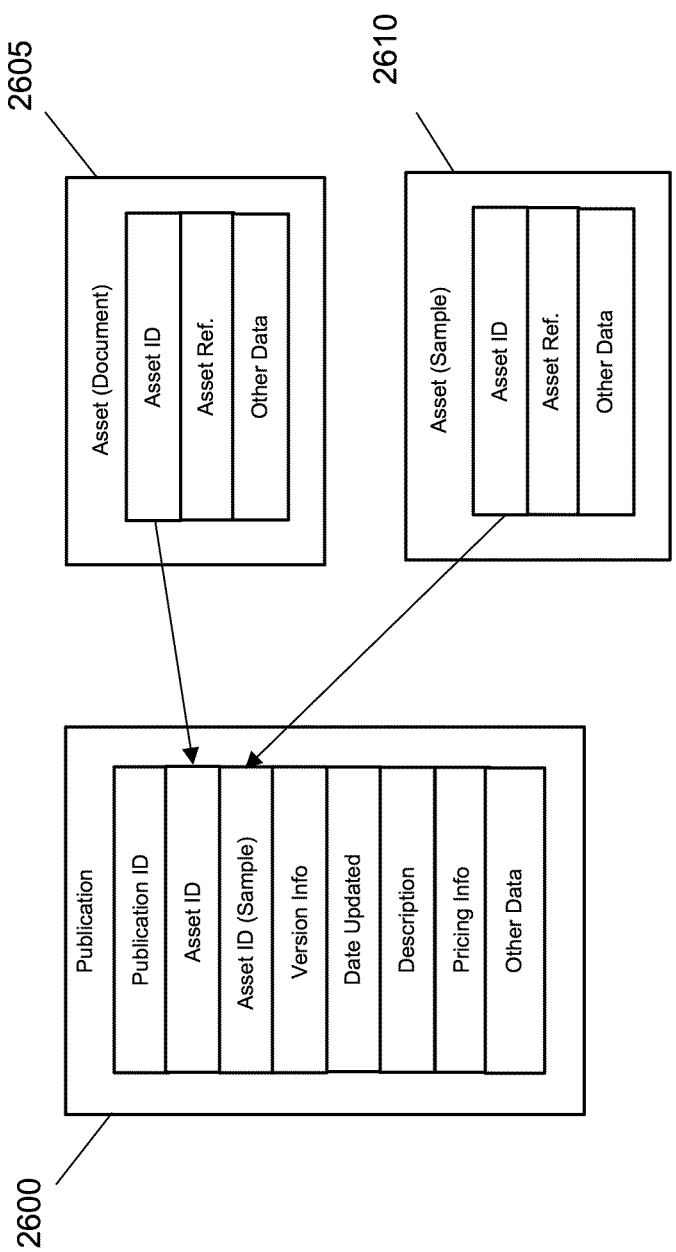
FIG. 26 conceptually illustrates several example data structures associated with a document publication.

FIG. 26 conceptually illustrates several example data structures associated with a publication. As shown, the figure includes a publication data structure 2600, and several asset data structures 2605 and 2610. The publication data structure 2600 of some embodiments contains different information (e.g., metadata) related to publishing a document. Here, the publication data structure 2600 includes a publication identification (ID) that identifies the publication and an asset identification that identifies an asset or document that is being published. The publication may include another asset ID for a sample document that is being published with the full-length document.

As shown, the publication data structure 2600 is associated with several other data related to the publication. Specifically, it includes version information (e.g., a version number), date updated, description, and pricing information. The publication data structure 2600 can be associated with other data, including language, ISBN, title, subtitle, imprint, series name, number in series, print length, etc. The data structure 2600 may also be associated with author information, target audience, related products, rights, etc. Many of these data are described above by reference to FIG. 11.

In the example illustrated in FIG. 26, the publication data structure 2600 is associated with two asset data structures 2605 and 2610. Specifically, the asset data structure 2605 represents the full-length document, and the asset data structure 2610 represents the sample document. Each of these asset data structures includes an asset ID and a reference to the asset (e.g., a reference to the document file). Each asset data structure can also include other data such as name of the asset, date created, etc.

In some embodiments, these data structures are used to publish the document to a document store of the content distribution system. For example, the content distribution system might use the data associated with the data structure 2600 to list the document on its store with pricing information, description, etc. The data contained in these data structures may be provided to the content distribution server as part of a package bundle that includes the full-length document and the sample document.

One of ordinary skill in the art will recognize that the data structures are examples data structure than can be modified in a number of different ways. For example, instead of the publication data structure 2600, the version information and/or the update data can be associated with the asset data structure 2605. In addition, the publication data structure 2600 can be associated with other different data structures, such as those that contain data relating to author information, target audience, related products, rights, etc.

VI. Electronic Systems

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 27:
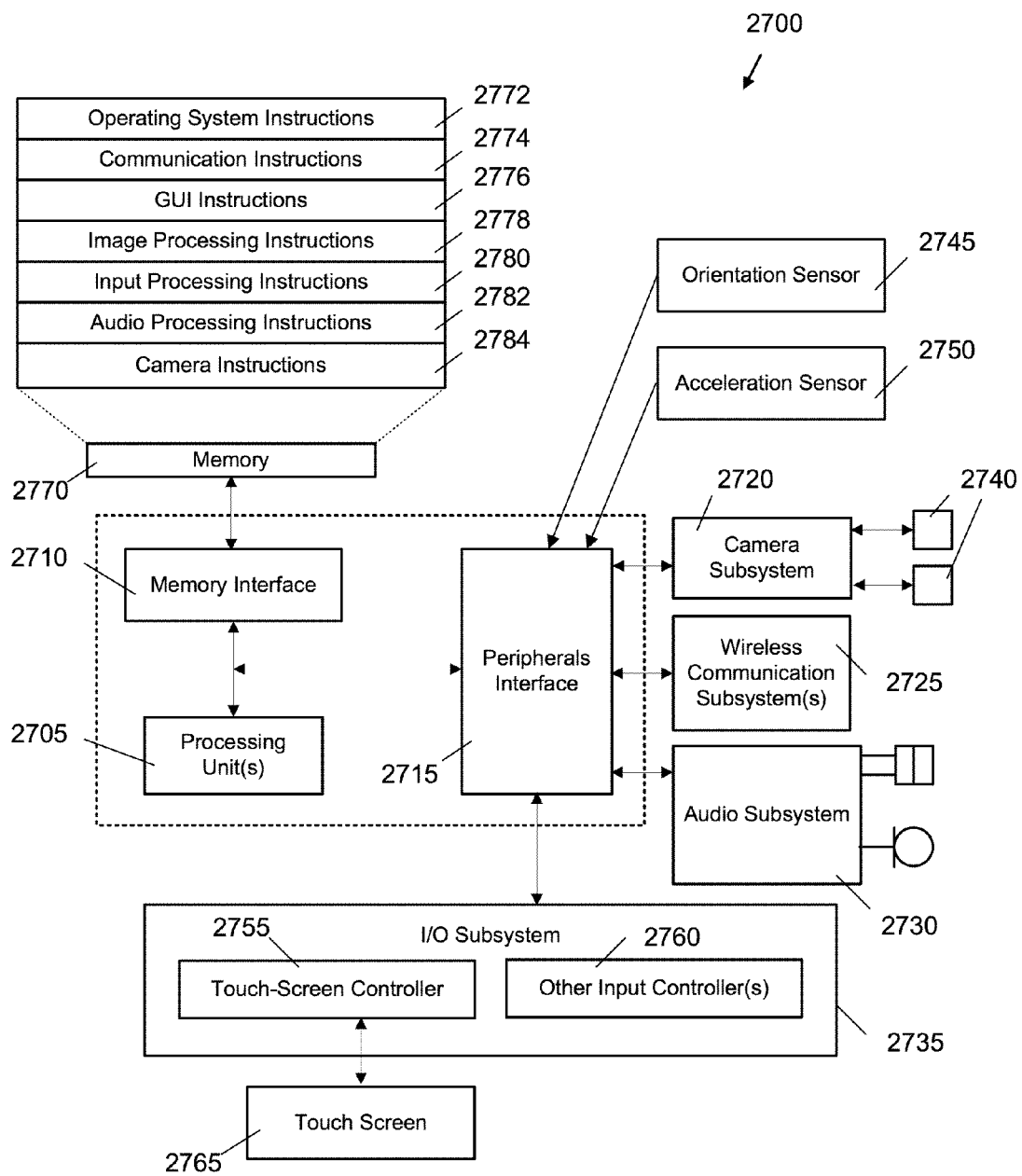
FIG. 27 illustrates an example of an architecture of a mobile computing device.

The applications of some embodiments operate on mobile devices. These applications include the content viewing application, content authoring application, content delivery application. FIG. 27 is an example of an architecture 2700 of such a mobile computing device. Examples of mobile computing devices include smartphones, tablets, laptops, etc. As shown, the mobile computing device 2700 includes one or more processing units 2705, a memory interface 2710 and a peripherals interface 2715.

The peripherals interface 2715 is coupled to various sensors and subsystems, including a camera subsystem 2720, a wireless communication subsystem(s) 2725, an audio subsystem 2730, an I/O subsystem 2735, etc. The peripherals interface 2715 enables communication between the processing units 2705 and various peripherals. For example, an orientation sensor 2745 (e.g., a gyroscope) and an acceleration sensor 2750 (e.g., an accelerometer) is coupled to the peripherals interface 2715 to facilitate orientation and acceleration functions.

The camera subsystem 2720 is coupled to one or more optical sensors 2740 (e.g., a charged coupled device (CCD) optical sensor, a complementary metal-oxide-semiconductor (CMOS) optical sensor, etc.). The camera subsystem 2720 coupled with the optical sensors 2740 facilitates camera functions, such as image and/or video data capturing. The wireless communication subsystem 2725 serves to facilitate communication functions. In some embodiments, the wireless communication subsystem 2725 includes radio frequency receivers and transmitters, and optical receivers and transmitters (not shown in FIG. 27). These receivers and transmitters of some embodiments are implemented to operate over one or more communication networks such as a GSM network, a Wi-Fi network, a Bluetooth network, etc. The audio subsystem 2730 is coupled to a speaker to output audio (e.g., to output different sound effects associated with different image operations). Additionally, the audio subsystem 2730 is coupled to a microphone to facilitate voice-enabled functions, such as voice recognition, digital recording, etc.

The I/O subsystem 2735 involves the transfer between input/output peripheral devices, such as a display, a touch screen, etc., and the data bus of the processing units 2705 through the peripherals interface 2715. The I/O subsystem 2735 includes a touch-screen controller 2755 and other input controllers 2760 to facilitate the transfer between input/output peripheral devices and the data bus of the processing units 2705. As shown, the touch-screen controller 2755 is coupled to a touch screen 2765. The touch-screen controller 2755 detects contact and movement on the touch screen 2765 using any of multiple touch sensitivity technologies. The other input controllers 2760 are coupled to other input/control devices, such as one or more buttons. Some embodiments include a near-touch sensitive screen and a corresponding controller that can detect near-touch interactions instead of or in addition to touch interactions.

The memory interface 2710 is coupled to memory 2770. In some embodiments, the memory 2770 includes volatile memory (e.g., high-speed random access memory), non-volatile memory (e.g., flash memory), a combination of volatile and non-volatile memory, and/or any other type of memory. As illustrated in FIG. 27, the memory 2770 stores an operating system (OS) 2772. The OS 2772 includes instructions for handling basic system services and for performing hardware dependent tasks.

The memory 2770 also includes communication instructions 2774 to facilitate communicating with one or more additional devices; graphical user interface instructions 2776 to facilitate graphic user interface processing; image processing instructions 2778 to facilitate image-related processing and functions; input processing instructions 2780 to facilitate input-related (e.g., touch input) processes and functions; audio processing instructions 2782 to facilitate audio-related processes and functions; and camera instructions 2784 to facilitate camera-related processes and functions. The instructions described above are merely exemplary and the memory 2770 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 27 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 27 may be split into two or more integrated circuits.

B. Computer System

Figure 28:
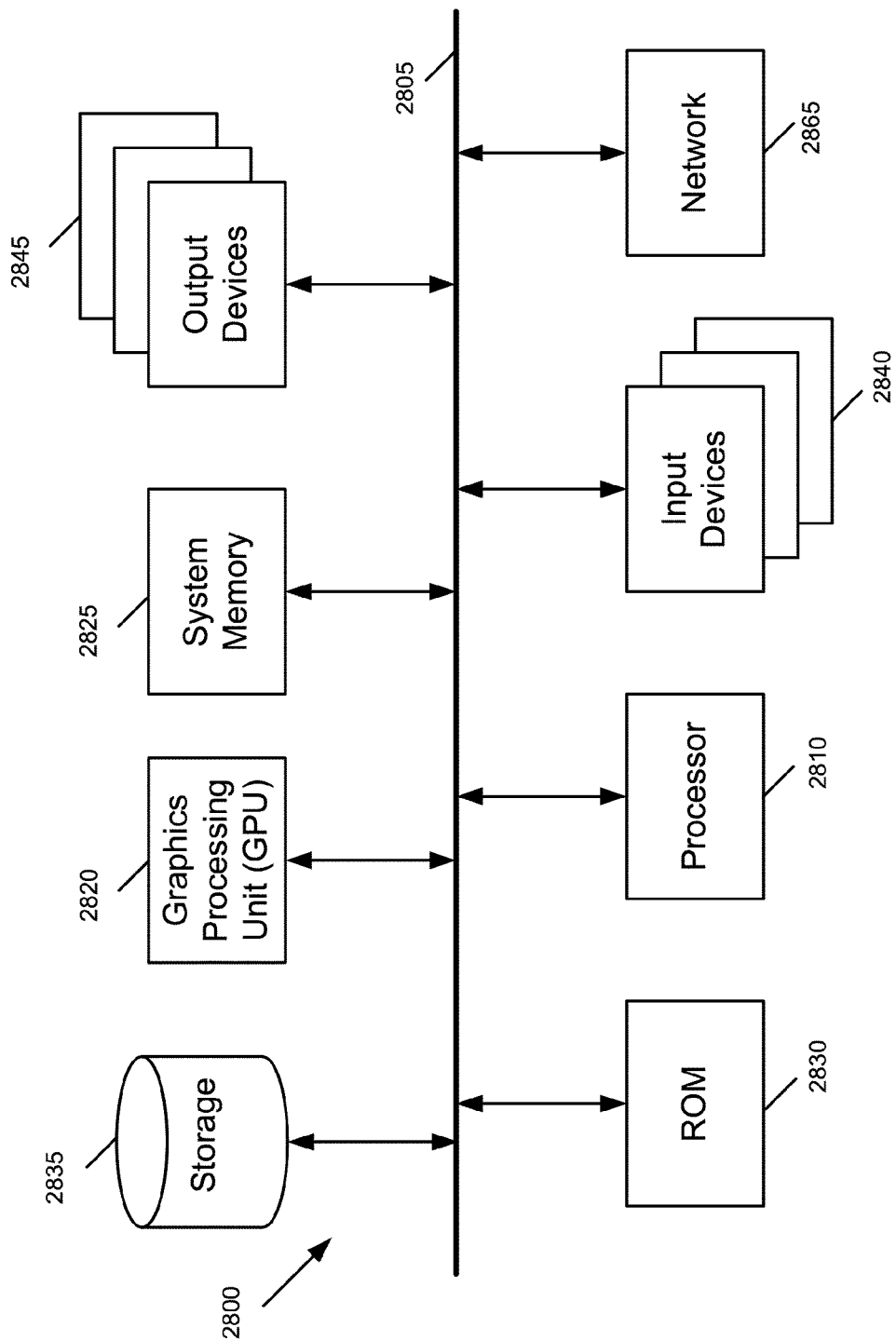
FIG. 28 conceptually illustrates another example of an electronic system with which some embodiments of the invention are implemented.

FIG. 28 conceptually illustrates another example of an electronic system 2800 with which some embodiments of the invention are implemented. The electronic system 2800 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 2800 includes a bus 2805, processing unit(s) 2810, a graphics processing unit (GPU) 2815, a system memory 2820, a network 2825, a read-only memory 2830, a permanent storage device 2835, input devices 2840, and output devices 2845.

The bus 2805 collectively represents all system, peripheral, and chipset buses that communicatively connect the numerous internal devices of the electronic system 2800. For instance, the bus 2805 communicatively connects the processing unit(s) 2810 with the read-only memory 2830, the GPU 2815, the system memory 2820, and the permanent storage device 2835.

From these various memory units, the processing unit(s) 2810 retrieves instructions to execute and data to process in order to execute the processes of the invention. The processing unit(s) may be a single processor or a multi-core processor in different embodiments. Some instructions are passed to and executed by the GPU 2815. The GPU 2815 can offload various computations or complement the image processing provided by the processing unit(s) 2810.

The read-only-memory (ROM) 2830 stores static data and instructions that are needed by the processing unit(s) 2810 and other modules of the electronic system. The permanent storage device 2835, on the other hand, is a read-and-write memory device. This device is a non-volatile memory unit that stores instructions and data even when the electronic system 2800 is off. Some embodiments of the invention use a mass-storage device (such as a magnetic or optical disk and its corresponding disk drive) as the permanent storage device 2835.

Other embodiments use a removable storage device (such as a floppy disk, flash memory device, etc., and its corresponding drive) as the permanent storage device. Like the permanent storage device 2835, the system memory 2820 is a read-and-write memory device. However, unlike storage device 2835, the system memory 2820 is a volatile read-and-write memory, such a random access memory. The system memory 2820 stores some of the instructions and data that the processor needs at runtime. In some embodiments, the invention's processes are stored in the system memory 2820, the permanent storage device 2835, and/or the read-only memory 2830. For example, the various memory units include instructions for processing multimedia clips in accordance with some embodiments. From these various memory units, the processing unit(s) 2810 retrieves instructions to execute and data to process in order to execute the processes of some embodiments.

The bus 2805 also connects to the input and output devices 2840 and 2845. The input devices 2840 enable the user to communicate information and select commands to the electronic system. The input devices 2840 include alphanumeric keyboards and pointing devices (also called "cursor control devices"), cameras (e.g., webcams), microphones or similar devices for receiving voice commands, etc. The output devices 2845 display images generated by the electronic system or otherwise output data. The output devices 2845 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 28, bus 2805 also couples electronic system 2800 to a network 2825 through a network adapter (not shown). In this manner, the computer can be a part of a network of computers (such as a local area network ("LAN"), a wide area network ("WAN"), or an Intranet, or a network of networks, such as the Internet. Any or all components of electronic system 2800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures (including FIGS. 12-14, 18, and 23) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

While the invention has been described with reference to numerous specific details, one of ordinary skill in the art will recognize that the invention can be embodied in other specific forms without departing from the spirit of the invention. For example, one of ordinary skill in the art will understand that many of the UI items of FIGS. 1-11, 15-17, and 19-22 can also be activated and/or set by a cursor control device (e.g., a mouse or trackball), a stylus, keyboard, a finger gesture (e.g., placing, pointing, tapping one or more fingers) near a near-touch sensitive screen, or any other control system in some embodiments. Thus, one of ordinary skill in the art would understand that the invention is not to be limited by the foregoing illustrative details, but rather is to be defined by the appended claims.

What is claimed is:

1. A method comprising:
    displaying pages of a book on a display of a computing device;
    providing, on said display, a step-by-step guide for publishing the book, the guide for sequentially presenting a plurality of publishing steps according to a workflow order for publishing the book and for indicating a current publishing step, the plurality of publishing steps comprising identifying errors and exporting the book for publication; and
    at each particular publishing step, providing a set of user interface (UI) items relating to the particular publishing step, the set of UI items for at least one of the publishing steps based on a set of properties of the book that are related to the particular publishing step,
    wherein a particular UI item is available for proceeding toward publishing when there are no identified errors or when the identified errors are non-blocking errors that do not prevent the book from being published, wherein the particular UI item is unavailable when the identified errors include at least one blocking error that needs to be resolved before publishing the book.

2. The method of claim 1, wherein the identified errors are listed in a display.

3. The method of claim 2, wherein one or more of the errors are listed on the display with at least one of an error type, a description of the error, and a page number of the book where the error was found.

4. The method of claim 1, wherein the blocking errors are displayed differently from the non-blocking errors on the display.

5. The method of claim 1, wherein the step by step guide is further for signing into a user's publishing account or for directing the user to create a new account if the user does not have an account.

6. A non-transitory machine readable medium storing a program that when executed by at least one processing unit provides a user interface (UI), the UI comprising:
- a publishing tool for preparing a book for publication by a content publisher and for exporting the book for publication,
- wherein the publishing tool comprises a first display section, a second display section and a particular UI item for a display of a computing device,
- the first display section comprising a step-by-step guide for sequentially presenting a plurality of publishing steps according to a workflow order for publishing the book and for indicating a current publishing step,
- the second display section for providing analysis of each step and identifying any error associated with the current publishing step, wherein to facilitate resolution of the error, the second display section presents for an identified error (i) an error type and (ii) a description of the error, wherein selection of at least one of the error's type and the error's description results in display of a page of the book where the identified error was found,
- the particular UI item for proceeding toward publishing, wherein the particular UI item is available when there is no identified error or when the identified error is a non-blocking error that does not prevent the book from being published, wherein the particular UI item is unavailable when the identified error is a blocking error that needs to be resolved before publishing the book.

7. The non-transitory machine readable medium of claim 6, wherein the publishing tool is further for specifying version information for the book.

8. The non-transitory machine readable medium of claim 6, wherein the publishing tool is further for specifying an option to generate a sample book from the book.

9. The non-transitory machine readable medium of claim 6, wherein the book is associated with a cover art, wherein the program creates a package that includes the exported book and the cover art for delivery to the content publisher.

10. The non-transitory machine readable medium of claim 6, wherein the publishing tool is further for delivering the exported book to the content publisher.

11. The non-transitory machine readable medium of claim 6, wherein the program is a content authoring application, wherein a separate content delivery application delivers the exported book to the content publisher, wherein the publishing tool comprises a selectable item that when selected opens the content delivery application to display metadata associated with the exported book.

12. A method of defining a user interface (UI) for a book publishing application, the method comprising:
- defining, at a computing device, a display area for displaying pages of a book; and
- defining, at the computing device, a publishing tool for preparing a book for publication by a content publisher and for exporting the book for publication, wherein the publishing tool comprises a first display section, a second display section, and a particular UI item,
- the first display section comprising a step-by-step guide for (i) sequentially presenting a plurality of publishing steps according to a workflow order for publishing the book; (ii) providing a visual indication of a current publishing step; and (iii) providing a visual indication for each completed publishing step,
- the second display section for providing analysis of each step and identifying any error associated with the current publishing step indicated in the first display section,
- the UI item for proceeding toward publishing, wherein the particular UI item is available when there is no identified error or when the identified error is a non-blocking error that does not prevent the book from being published, wherein the particular UI item is unavailable when the identified error is a blocking error that needs to be resolved before publishing the book.

13. The method of claim 12, wherein the publishing tool comprises a display section for displaying a list of errors.

14. The method of claim 13, wherein one or more of the errors are listed in the section with at least one of an error type, a description of the error, and a page number of the book where the error was found.

15. A non-transitory machine readable medium storing a program for execution by at least one processing unit, the program comprising sets of instructions for:
- displaying pages of a book on a display of a computing device; and
- providing, on said display, a step-by-step guide for publishing the book, the guide for sequentially presenting a plurality of publishing steps according to a workflow order for publishing the book and for indicating a current publishing step, the plurality of publishing steps comprising identifying errors and exporting the book for publication; and
- at each particular publishing step, providing a set of user interface (UI) items relating to the particular publishing step, the set of UI items for at least one of the publishing steps based on a set of properties of the book that are relevant to the particular publishing step,
- wherein a particular UI item is available for proceeding toward publishing when there are no identified errors or when the identified errors are non-blocking errors that do not prevent the book from being published, wherein the particular UI item is unavailable when the identified errors include at least one blocking error that needs to be resolved before publishing the book.

16. The non-transitory machine readable medium of claim 15, wherein the program further comprises a set of instructions for displaying a list of errors.

17. The non-transitory machine readable medium of claim 15, wherein one or more of the errors are displayed with at least one of an error type, a description of the error, and a page number of the book where the error was found.

* * * * *